United States Patent [19]
Matsugatani et al.

[11] Patent Number: 6,040,796
[45] Date of Patent: Mar. 21, 2000

[54] RADAR SYSTEM INSTALLABLE IN AN AUTOMOTIVE VEHICLE FOR DETECTING A TARGET OBJECT

[75] Inventors: Kazuoki Matsugatani; Masanobu Yukumatsu, both of Kariya, Japan

[73] Assignee: Denso Corporation, Kariya, Japan

[21] Appl. No.: 09/039,942

[22] Filed: Mar. 17, 1998

[30] Foreign Application Priority Data

Mar. 18, 1997 [JP] Japan .................................. 9-064865
May 16, 1997 [JP] Japan .................................. 9-127266
Aug. 29, 1997 [JP] Japan .................................. 9-235157

[51] Int. Cl.$^7$ .............................. G01S 13/93; G01S 13/42
[52] U.S. Cl. .......................... 342/70; 342/109; 342/130; 342/101; 342/111; 342/116; 342/193; 342/196
[58] Field of Search .................... 342/70, 71, 72, 342/84, 87, 99, 109, 112, 115, 128, 129, 130, 131, 132, 134, 135, 194, 195, 101, 111, 116, 192, 193, 196

[56] References Cited

U.S. PATENT DOCUMENTS

| | | | |
|---|---|---|---|
| 3,823,399 | 7/1974 | Yamanaka | 342/111 |
| 3,872,475 | 3/1975 | Yamanaka et al. | 342/111 |
| 4,208,659 | 6/1980 | Allezard | 342/98 |
| 5,274,380 | 12/1993 | Yatsuka et al. | 342/70 |
| 5,381,153 | 1/1995 | Saito et al. | 342/70 |
| 5,606,737 | 2/1997 | Suzuki et al. | 455/319 |
| 5,619,208 | 4/1997 | Tamatsu et al. | 342/70 |
| 5,677,695 | 10/1997 | Suzuki et al. | 342/109 |

FOREIGN PATENT DOCUMENTS

| | | |
|---|---|---|
| 54-130892 | 10/1979 | Japan . |
| 4-142486 | 5/1992 | Japan . |
| 5-40169 | 2/1993 | Japan . |
| 6-342063 | 12/1994 | Japan . |

OTHER PUBLICATIONS

"Report on Research and Development of Rader for Automobile" by Denpa System Kaihatsu Center, pp. 52–98, Jul. 1993.

*Primary Examiner*—John B. Sotomayor
*Attorney, Agent, or Firm*—Pillsbury Madison & Sutro LLP

[57] ABSTRACT

A modulation signal generating section produces a modulation signal for controlling an oscillation frequency of a voltage-controlled oscillator. The modulation signal generating section comprises a triangular wave oscillator producing a linear modulation component of a triangular waveform which varies the modulation frequency linearly, a sine wave oscillator producing a cyclic modulation component of a sine waveform which varies the modulation frequency cyclically, and a signal adder producing the modulation signal by adding the linear modulation component and the cyclic modulation component. A transmitting signal frequency modulated by the modulation signal is mixed with a received signal and produces a beat signal comprising a fundamental wave component of a beat frequency and harmonic components.

19 Claims, 26 Drawing Sheets

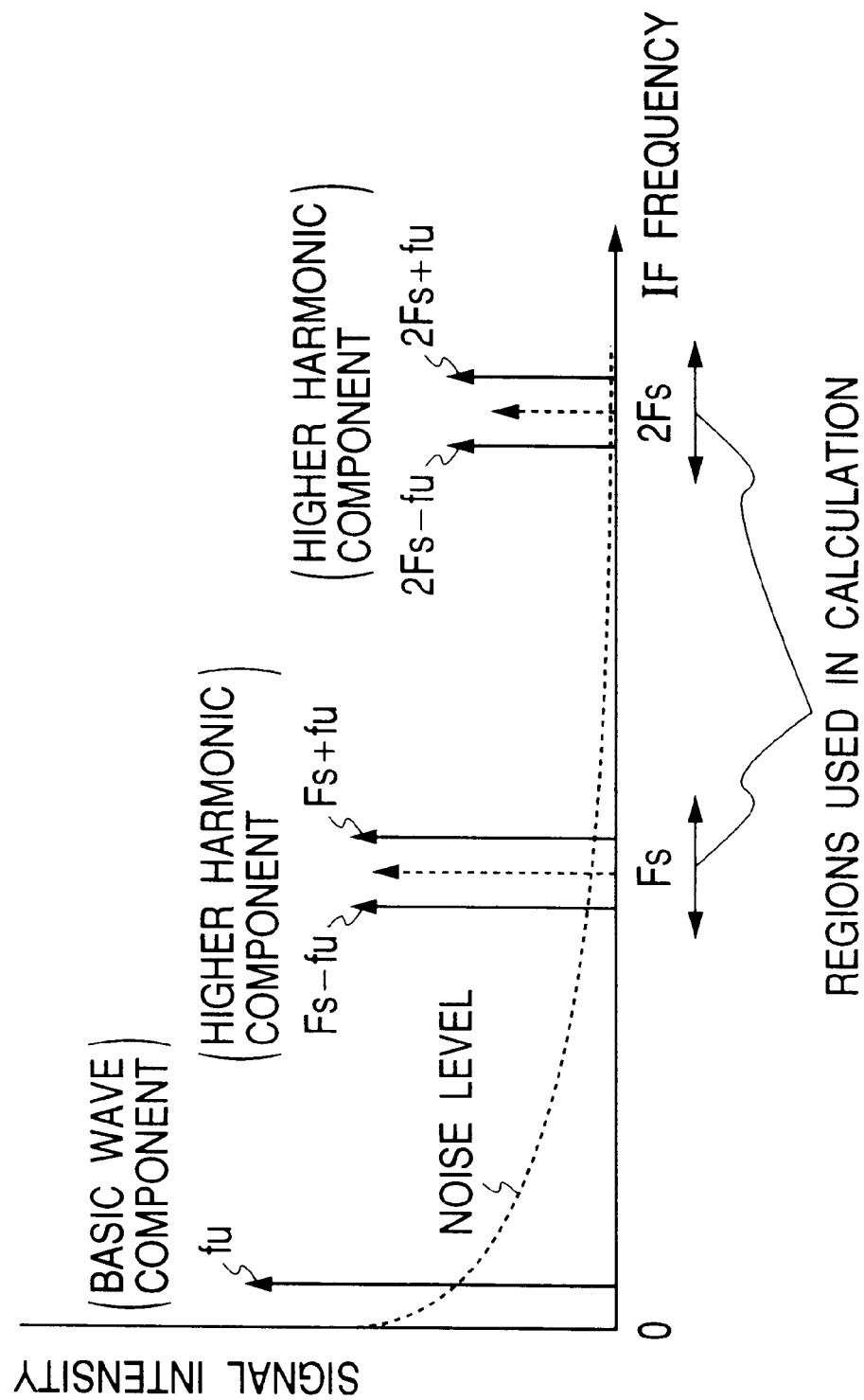

RADAR SYSTEM INSTALLABLE IN AN AUTOMOTIVE VEHICLE FOR DETECTING A TARGET OBJECT

BACKGROUND OF THE INVENTION

The present invention relates to a radar system, such as an FMCW (Frequency Modulated Continuous Wave) radar, which is preferably used for preventing a collision of a movable object. In such a radar system, a radar wave carrying a frequency-modulated transmitting signal is emitted toward a target object. Then, the radar wave is reflected from the target object and received by the radar system. During such transmitting and receiving operations of the radar wave, obtained information is used for calculating a relative distance and/or a relative velocity of the target object.

To enhance the safety of an automotive vehicle, installing a radar system into an automotive vehicle is a prospective attempt. The FMCW radar is suitable for the use in an automotive vehicle because of its capability of simultaneously detecting a distance and a relative velocity of an object as well as simple, compact and cheap structural features.

FIG. 30A shows frequency modulations of a transmitting signal Ss and a reflected received signal Sr of a conventional FMCW radar. As shown by a solid line, the transmitting signal Ss is frequency modulated by a triangular wave modulation signal, so that the frequency increases linearly relative to time and then decreases reversely. A radar wave carrying the transmitting signal Ss is emitted through a transmitter antenna toward a target object. The radar wave is then reflected from the target object and received by a receiver antenna of the radar system. A dotted line shows the received signal Sr.

There is a significant delay time Td between the transmitting signal Ss and the received signal Sr. This delay time Td is a time required for the radar wave going and returning between the radar system and the target object. In other words, the delay tie Td is proportional to the distance between the radar system and the target object.

Furthermore, there is a significant frequency difference Fd between the transmitting signal Ss and the received signal Sr. This frequency difference Fd is a Doppler shift factor caused by a relative velocity between the radar system and the target object.

The received signal Sr and the transmitting signal Ss are mixed in a mixer. FIG. 30B shows a beat signal Sb produced from the mixer. The beat signal Sb represents a frequency difference between the transmitting signal Ss and the received signal Sr.

The beat signal Sb takes different values in accordance with the type of frequency modulation. When the transmitting signal Ss has an increasing frequency, the beat signal Sb has a frequency referred to as an ascendant modulation frequency fu. When the transmitting signal Ss has a decreasing frequency, the frequency of the beat signal Sb is referred to as a descendant modulation frequency fd.

The following equations (1) and (2) define a distance R and a relative velocity V of the target object.

$$R = \frac{c \cdot T}{8 \cdot \Delta F} \cdot (fu + fd) \quad (1)$$

$$V = \frac{c}{4 \cdot Fo} \cdot (fu - fd) \quad (2)$$

where "c" represents a radio wave propagation speed, "T" represents a cyclic period of a triangular wave used for modulating the transmitting signal Ss, $\Delta F$ represents a frequency variation width of the transmitting signal Ss, and Fo represents a central frequency of the transmitting signal Ss (refer to FIG. 30A).

When the FMCW radar system is installed in an automotive vehicle, it is usually necessary to have a detectable distance in a range of approximately 100 to 200 m with a detecting ability equivalent to a resolution level of several meters.

A distance resolution $\Delta R$ of the FMCW radar system is generally expressed by the following equation (3).

$$\Delta R = \frac{c}{2 \cdot \Delta F} \quad (3)$$

As apparent from the equation (3), the distance resolution $\Delta R$ of several meters is obtained when the frequency variation width $\Delta F$ of the transmitting signal Ss is approximately 100 MHz. To obtain such a desirable frequency variation width $\Delta F$, the central frequency Fo of the transmitting signal Ss needs to be set in a frequency range of several tens to hundreds GHz, which is generally referred to as "millimeter wave."

For example, the transmitting signal Ss may have the frequency variation width $\Delta F=100$ MHz and the cyclic period T=1 ms. The target object may have the relative velocity V=0 (i.e., fu=fd) and be located at the distance R=100 m. In such a condition, the beat frequencies fu and fd would be 133 kHz.

When the target object is located within 100 m, the detectable beat signal Sb is not larger than 133 kHz. When relative velocity V is not zero, a frequency of the detectable beat signal Sb differs from the frequency corresponding to V=0 by a Doppler shift amount. In short, when installed in an automotive vehicle, the radar system must have a capability of detecting the beat signal in a range of several tens to hundreds kHz.

However, in processing millimeter waves, a high-frequency mixer is subjected to AM-FM conversion noises composed of frequency components of signal intensity fluctuation or 1/f noises having intensities inverse proportional to the frequencies. The AM-FM conversion noises and the 1/f noises are collectively referred to as low-frequency noises whose intensities are relatively strong in a frequency range of several tens to hundreds kHz of the beat signal Sb. This leads to a serious deterioration in a signal versus noise ratio (hereinafter referred to as S/N ratio) of the beat signal Sb.

FIG. 31 shows a conventional FMCW radar system disclosed in Published Unexamined Japanese Patent Application No. 5-40169 whose counterpart U.S. patent application is patented as U.S. Pat. No. 5,381,153. According to this radar system 110, a high-frequency oscillator 112 produces a high-frequency transmitting signal Ss. A modulation signal generating circuit 126 generates a modulation signal Sm. The transmitting signal Ss produced from the high-frequency oscillator 112 is modulated in accordance with this modulation signal Sm. Through this modulation, the frequency of the transmitting signal Ss causes a triangular change.

A transmitter antenna 16 emits a radar wave carrying the transmitting signal Ss supplied from the high-frequency oscillator 112. The radar wave is reflected from a target object and received by a receiver antenna 120. The receiver antenna 120 sends a received signal Sr to a high-frequency mixer 122. A distributor 118 separates part of the transmitting signal Ss and sends it as a local signal L to the high-frequency mixer 122. The high-frequency mixer 122 mixes the received signal Sr with the local signal L, and produces a beat signal Sb.

A second oscillator 136 produces a switching signal whose frequency is larger than two times the beat signal Sb. A switching circuit 138 is interposed between the receiver antenna 120 and the high-frequency mixer 122. The switching circuit 138 is cyclically activated and deactivated so as to selectively transmit the received signal Sr to the high-frequency mixer 122 in response to the switching signal supplied from the second oscillator 136. Thus, the high-frequency mixer 122 produces the beat signal Sb having a frequency controlled in accordance with the switching signal.

A band-pass filter 132 extracts frequency components of the beat signal Sb thus selected and produced from the high-frequency mixer 122. A band-pass filter 140 shapes the switching signal supplied from the second oscillator 136. An intermediate-frequency mixer 134 mixes the filtered signals supplied from the band-pass filters 132 and 140, and produces a converted beat signal Sb2 having a frequency in an inherent range of several tens to hundreds kHz.

According to the above-described radar system 110, it becomes possible to produce a beat signal having a frequency of several MHz which receives no substantial influence of the low-frequency noises when the switching signal has a frequency of several MHz. The intermediate-frequency mixer 134 handles the beat signal and the switching signals of several MHz. Thus, the frequency range handled by the intermediate-frequency mixer 134 is lower than the millimeter wave handed by the high-frequency mixer 122. The low-frequency noises involved in the output of the intermediate-frequency mixer 134 are smaller than those of the high-frequency mixer 122. The beat signal Sbs produced from the intermediate-frequency mixer 134 has an improved S/N ratio.

However, according to the above-described conventional radar system 110, the switching circuit 138 is interposed between the receiver antenna 120 and the high-frequency mixer 122. In other words, the switching circuit 138 is in a transmission path of the received signal Sr in a millimeter wave band. This is disadvantageous because the received signal Sr, significantly weakened and returned from the target object, is further attenuated, causing a serious deterioration in the sensitivity of the target object detection.

The switching circuit 138 is basically a high-frequency circuit processing millimeter wave band signals. Such a high-frequency circuit is difficult to install into a general circuit, expensive in cost, and time consuming in manufacturing. Thus, the price of the system will be increased significantly.

SUMMARY OF THE INVENTION

In view of the foregoing problems encountered in the prior art, the present invention has an object to provide a novel and excellent radar system which is simple in system arrangement and capable of removing an adverse influence of low-frequency noises without using an additional high-frequency circuit component.

In order to accomplish the above-described and other related objects, a first aspect of the present invention provides a radar system comprising a transmitting signal generating means (12, 14) for producing a high-frequency transmitting signal (Ss) which is frequency modulated and carried on a radar wave, a high-frequency mixer (22) for mixing a received signal (Sr) of the radar wave reflected from a target object with a local signal (L) derived from the transmitting signal produced from the transmitting signal generating means, and producing a beat signal (Sb) having a frequency component representing a difference between the received signal and the local signal, and calculating means (24) for obtaining a distance (R) and a relative velocity (V) of the target object based on the beat signal produced from the high-frequency mixer.

The transmitting signal generating means produces the transmitting signal modulated in accordance with a linear modulation component (Ma) and a cyclic modulation component (Mb). The linear modulation component (Ma) vanes a frequency of the transmitting signal linearly relative to time, while the cyclic modulation component (Mb) varies the frequency of the transmitting signal cyclically at a cyclic frequency larger than two times a frequency of the beat signal. And, the calculating means (24) calculates the distance and the relative velocity of the target object based on higher harmonic components (n×Fs±fu) of the beat signal produced when the transmitting signal is modulated by the cyclic modulation component.

The transmitting signal (Ss) thus modulated at a certain time t0 is regarded as a signal obtained when a frequency Ft signal obtained through a modulation based on a linear modulation component is frequency modulated by a frequency Fs signal of the cyclic modulation component.

FIG. 23A shows a spectrum of the transmitting signal (Ss) obtained at this moment, with a central frequency at a frequency Ft and side bands of frequencies spaced from the central frequency by n (n=±1, ±2, ±3, - - - ) times the frequency Fs.

FIG. 23B shows a spectrum of the received signal (Sr) by a dotted line. As apparent from FIG. 23B, the received signal (Sr) is shifted from the transmitting signal (Ss) by a beat frequency fu. Generally, the beat frequency is determined by a delay time of the radar wave going and returning between the radar system and the target object and a frequency Doppler shift derived from a relative velocity between the radar system and the target object. The beat frequency is classified into two kinds of beat signals; i.e., an ascendant beat frequency fu corresponding an ascendant modulation and a descendant beat frequency fd corresponding a descendant modulation. However, this invention regards the beat frequency "fu" as a representative one.

The beat signal represents a frequency difference between the transmitting signal (Ss) and the received signal (Sr) mixed by the high-frequency mixer. Thus, as apparent from FIG. 23B, the beat signal has signal components at the beat frequency "fu" and at frequencies n×fs±fu (n=1, 2, 3, - - - ) derived from the difference between the transmitting signal (Ss) and the received signal (Sr). FIG. 24 shows a spectrum showing a fundamental wave component corresponding to the beat frequency "fu" and higher harmonic components corresponding to the frequencies n×Fs±fu (n=1, 2, 3, - - - ).

The frequency Fs of the cyclic modulation component is set larger than two times the beat frequency fu of the fundamental wave component of the beat signal. Therefore, the frequencies Fs±fu are sufficiently far from the beat frequency fu and surely discriminative.

The calculating means (24) extracts the beat frequency fu using the higher harmonic components (having frequencies n×Fs±fu) of the beat signal, to calculate the distance and the relative velocity of the target object.

In this manner, the first aspect of the present invention uses the transmitting signal (Ss) whose frequency not only varies linearly but also varies cyclically. Thus, the high-frequency mixer (22), mixing the transmitting signal (Ss) and the received signal (Sr), can produce higher harmonic components having higher frequencies as well as the fundamental wave component.

The higher harmonic components are generally excellent in a signal-versus-noise ratio because they are free from stubborn low-frequency noises, such as AM-FM conversion noises and 1/f noises. As indicated by a lotted line in FIG. 24, a noise level of the low-frequency noises declines with increasing frequency. Thus, the beat frequency fu can be accurately detected by using the higher harmonic components of the beat signal. Accordingly, as a radar system, having a capability of detecting the higher harmonic components is advantageous in that the calculation for detecting the target object is accurately performed.

In this manner, according to the first aspect of the present invention, it becomes possible to enhance the performance of the radar system without adding complicated and expensive hardware for processing higher-frequency components.

Preferably, the transmitting signal generating means comprises first component generating means (26) for producing the linear modulation component (Ma), second component generating means (27) for producing the cyclic modulation component (Mb), adding means (28) for adding the linear modulation component and the cyclic modulation component and producing a modulation signal (Sm), and high-frequency oscillator (12) producing the high-frequency transmitting signal (Ss) whose frequency is variable in accordance with the modulation signal (Sm).

Furthermore, an intermediate-frequency mixer (34) mixes the beat signal (Sb) supplied from the high-frequency mixer (22) with the cyclic modulation component (Mb) as a second local signal, and produces a second beat signal (Sb2) having a frequency component representing a difference between the mixed signals. And, the calculating means (24) calculates the distance and the relative velocity of the target object based on the fundamental wave component (fu) of the second beat signal supplied from the intermediate-frequency mixer (34).

FIG. 25 shows a spectrum of the second beat signal (Sb2) thus produced. The higher harmonic components of Fs±fu are converted into the fundamental wave component of the beat frequency fu. The low-frequency noises, indicated by a dotted line, is reduced at the beat frequency fu. Accordingly, the calculating operation is carried out by using the fundamental wave component of the beat frequency fu (several tens to hundreds kHz).

Preferably, to improve the S/N ratio of the second beat signal, a low-pass filter (68) is interposed between the intermediate-frequency mixer (34) and the calculating means (24) for removing unnecessary harmonic components from the second beat signal.

Preferably, a frequency multiplier (42) receives the cyclic modulation component (Mb) produced from the second component generating means and producing a frequency-multiplied modulation component whose frequency is equivalent to n times a frequency (Fs) of the cyclic modulation component (Mb), where n is an integer. And, the frequency-multiplied modulation component is supplied to the intermediate-frequency mixer (34) as the second local signal. With this arrangement, it becomes possible to convert the higher harmonic components of frequencies n×Fs±fu into the fundamental wave component of the beat signal. By setting the amplification factor "n" appropriately, excellent harmonic components having better S/N ratios can be selected and used for obtaining the position (distance and relative velocity) of the target object.

Preferably, a band-pass filter (32) is interposed between the high-frequency mixer (22) and the intermediate-frequency mixer (34). This band-pass filter (32) has a central frequency equivalent to a frequency of the second local signal with a band width wider than two times a frequency of the fundamental wave component of the beat signal. With this arrangement, unnecessary signal components and low-frequency noises can be removed effectively. The S/N ratio of the fundamental wave component of the second beat signal can be increased. FIG. 26 shows a spectrum of the second beat signal produced from the intermediate-frequency mixer (34) when such a band-pass filter is used. This arrangement is especially effective when a fast Fourier transformation is used in the frequency spectrum analysis, because the presence of unnecessary higher harmonic components will significantly increase the burden of computations required in the analysis.

Preferably, a frequency multiplying means (76) is provided for producing a frequency-multiplied modulation component whose frequency is equivalent to n times a frequency of the cyclic modulation component (Mb), where n is an integer. A local signal switching means (74) selectively supplies the cyclic modulation component or the frequency-multiplied modulation component to the intermediate-frequency mixer as the second local signal. And a local signal switching control means (24, steps S110–S190) controls a switching operation of the local signal switching means (74) based on a signal-versus-noise ratio of the fundamental wave component of the beat signal (Sb2) entered in the calculating means. Thus, an optimized second local signal having a better signal-versus-noise ratio is supplied to the intermediate-frequency mixer.

Furthermore, a first band-pass filter (82) and a second band-pass filter (84) are provided in parallel with each other. The first band-pass filter (82) has a central frequency equivalent to the frequency (Fs) of the cyclic modulation component (Mb) produced from the second component generating means (27) with a band width wider than two times the frequency of the fundamental wave component of the beat signal. The second band-pass filter (84) has a central frequency equivalent to the frequency of the frequency-multiplied modulation component produced from the frequency multiplying means. A filter switching means (86, 88) is interposed between the high-frequency mixer and the intermediate-frequency mixer for cooperatively selecting the first band-pass filter (82) or the second band-pass filter (84). A filter switching control means (24) controls a switching operation of the filter switching means (86, 88) in such a manner that the first band-pass filter is selected when the cyclic modulation component (Mb) is selected as the second local signal, while the frequency-muitiplied modulation component is selected as the second local signal. With this arrangement, excellent signal components having better S/N ratio can be always supplied to the calculating means.

FIG. 27A shows a relationship between a modulation index (i.e., an intensity of the cyclic modulation component) and an intensity of the higher harmonic components, resulting from a computer simulation. The modulation index M is defined by an equation M=(ΔFa/2)/Fs when ΔFa represents an intensity (i.e., maximum frequency deviation) of the cyclic modulation component and Fs represents a frequency of the cyclic modulation component.

In this computer analysis, waveforms of the transmitting and received signals as well as the first and second local signals are reproduced in a time-series manner. An operation of the mixer is simulated by multiplying the signal waveforms to be mixed. An output (i.e., multiplication result) of the mixer is obtained as a signal waveform of the beat signal and separated into a frequency spectrum through a fast Fourier transform, to calculate the intensity of the peak frequency component and the intensity of the beat signal. Regarding the frequency modulation factors of the transmitting signal, the frequency of the cyclic modulation component is set to Fs=1 MHz and the linear modulation component has a triangular waveform of cyclic period T=2.56 ms. A frequency modulation width of the received signal is ΔF=100 MHz. The target object is assumed to be located 50 m ahead of the radar system.

As a result (FIG. 27A) of the above-described computer simulation, it is confirmed that the intensity of each higher harmonic component varies in accordance with the modulation index. When the primary harmonic component is strong, the secondary harmonic component is weak. On the contrary, when the primary harmonic component is weak, the secondary harmonic component is strong. In other words, the primary and secondary harmonic components are mutually in a supplementary relationship. The noise level remains substantially constant irrespective of a variation of the modulation index.

FIG. 27B shows a relationship between the modulation index and an S/N ratio of the higher harmonic components. As apparent from the graph, a similar result is obtained.

In view of the foregoing result, it is preferable that an intensity adjusting means (72) is associated with the second component generating means (27) for adjusting a signal intensity of the cyclic modulation component. And, an intensity adjustment control means (24, steps S210–S270) controls an adjustment operation of the intensity adjusting means based on a signal-versus-noise ratio of the fundamental wave component or harmonic components of the beat signal (Sb2) entered in the calculating means. Thus, an optimized cyclic modulation component having a better signal-versus-noise ratio is supplied to the adding means (28).

Preferably, the second component generating means (27) is associated with frequency adjusting means (24) for adjusting the frequency of the cyclic modulation component. And, a frequency adjustment control means (24, steps S310–S380) controls an adjustment operation of the frequency adjusting means based on a signal-versus-noise ratio of the fundamental wave component or harmonic components of the beat signal (Sb2) entered in the calculating means. Thus, an optimized cyclic modulation component having a better signal-versus-noise ratio is supplied to the adding means (28).

The higher harmonic components of frequencies n×Fs±fu of the beat signal produced from the high-frequency mixer are variable in accordance with the frequency Fs of the cyclic modulation component. Thus, the above-described arrangement makes it possible to flexibly change the frequencies of the higher harmonic components.

Preferably, the cyclic modulation component (Mb) has a sine waveform signal.

Next, a second aspect of the present invention provides a radar system comprising transmitting signal generating means (12, 52) for producing a high-frequency transmitting signal (Ss) which is frequency modulated so as to vary linearly relative to time and carried on a radar wave, local signal generating means (18, 54, 56) for producing a local signal (L) based on a branch signal (St) separated from the transmitting signal produced from the transmitting signal generating means, and a high-frequency mixer (22) for mixing a received signal (Sr) of the radar wave reflected from a target object with the local signal produced from the local signal generating means and producing a beat signal (Sb1) having a frequency component representing a difference between the received signal and the local signal.

Specifically, the local signal generating means comprises a local modulation signal generating means (54) for producing a local modulation signal (Mb) having a fundamental wave component whose frequency is larger than two times a beat frequency representing a frequency difference between the transmitting signal and the received signal, and a branch signal modulating means (56) for modulating an amplitude of the branch signal in accordance with the local modulation signal produced from the local modulation signal generating means, and producing the local signal.

When the branch signal (i.e., transmitting signal) has a frequency Ft, the local signal at this time "t" is regarded as being obtained by amplitude modulating the branch signal of frequency Fp by the local modulation signal of frequency Fp.

FIG. 28A shows a spectrum of the local signal(L) obtained at this moment, with a central frequency at a frequency Ft and side bands of frequencies spaced from the central frequency by n (n=±1, ±2, ±3, - - - ) times the frequency Fp.

FIG. 28B shows a spectrum of the received signal (Sr) by a dotted line. As apparent from FIG. 28B, the received signal (Sr) is shifted from the transmitting signal (Ss) by a beat frequency fu determined by a delay time of the radar wave going and returning between the radar system and the target object and a frequency Doppler shift derived from a relative velocity between the radar system and the target object.

The beat signal represents a frequency difference between the transmitting signal (Ss) and the received signal (Sr) mixed by the high-frequency mixer. Thus, as apparent from FIG. 28B, the beat signal has signal components at the beat frequency "fu" and at frequencies n×Fp±fu (n=1, 2, 3, - - - ) derived from the difference between the transmitting signal (Ss) and the received signal (Sr). FIG. 29 shows a spectrum showing a fundamental wave component corresponding to the beat frequency "fu" and higher harmonic components corresponding to the frequencies n×Fp±fu (n=1, 2, 3, - - - ).

Thus, setting the fundamental wave frequency Fp of the local modulation signal in a region not influenced by the low-frequency noises makes it possible to obtain the higher harmonic components of the beat signal excellent in the S/N ratio. This leads to an accurate detection of the target object.

Preferably, the radar system further comprises a calculating means (24) for obtaining a distance (R) and a relative velocity (V) of the target object based on the beat signal produced from the high-frequency mixer.

Preferably, the radar system Her comprises an intermediate-frequency mixer (66) which mixes the beat signal supplied from the high-frequency mixer with the local modulation signal supplied from the local modulation signal generating means, and produces a second beat signal (Sb2) having a frequency component representing a difference between the mixed signals.

This arrangement makes it possible to convert the higher harmonic components (frequencies:n×Fp±fu) of the beat signal into the fundamental wave component of the beat frequency fu.

Preferably, the calculating means (24) obtains the distance and the relative velocity of the target object based on the second beat signal produced from the intermediate-frequency mixer.

Preferably, a low-pass filter (68) is provided to remove unnecessary harmonic components from the second beat signal supplied from the intermediate-frequency mixer.

Preferably, at least one of a band-pass filter (62) and a narrow-band amplifier (64) is interposed between the high-frequency mixer and the intermediate-frequency mixer. The band-pass filter (62) receives the beat signal produced from the high-frequency mixer and removes unnecessary frequency components which are far from the frequency of the fundamental wave component of the local modulation signal (Mb). And, the narrow-band amplifier (64) amplifies a signal component whose frequency is close to the frequency of the fundamental wave component of the local modulation signal (Mb). The above-described arrangements are effective to improve the S/N ratio of the beat signal.

Preferably, the local modulation signal generating means (54) is associated with frequency adjusting means (24) for adjusting the frequency of the local modulation signal. A frequency adjustment control means (24) controls an adjustment operation of the frequency adjusting means based on a signal-versus-noise ratio of the fundamental wave component or harmonic components of the beat signal entered in the calculating means, so that an optimized local modulation signal having a better signal-versus-noise ratio is supplied to the branch signal modulating means (56).

The frequencies $n \times Fp \pm fu$ of the higher harmonic components of the beat signal produced from the higher-frequency mixer are variable in accordance with the frequency Fp of the cyclic modulation component (refer to FIG. 29). Therefore, the frequencies of the higher harmonic components of the beat signal can be arbitrarily changed by adjusting the frequency Fp of the cyclic modulation component.

Preferably, the local modulation signal (Mb) produced from the local modulation signal generating means has a single frequency of the fundamental wave component or has a rectangular waveform.

Reference numerals in parenthesis, added in the above description, show the correspondence to the components disclosed in later-described preferred embodiments of the present invention. Therefore, these numerals are merely used for expediting the understanding to the present invention and not used for narrowly interpreting the scope of the present invention.

BRIEF DESCRIPTION OF THE DRAWINGS

The above and other objects, features and advantages of the present invention will become more apparent from the following detailed description which is to be read in conjunction with the accompanying drawings, in which:

FIGS. 24 is a view showing signal components of the beat signal and a noise level in accordance with the first aspect of the present invention;

DESCRIPTION OF THE PREFERRED EMBODIMENTS

Figure 1:
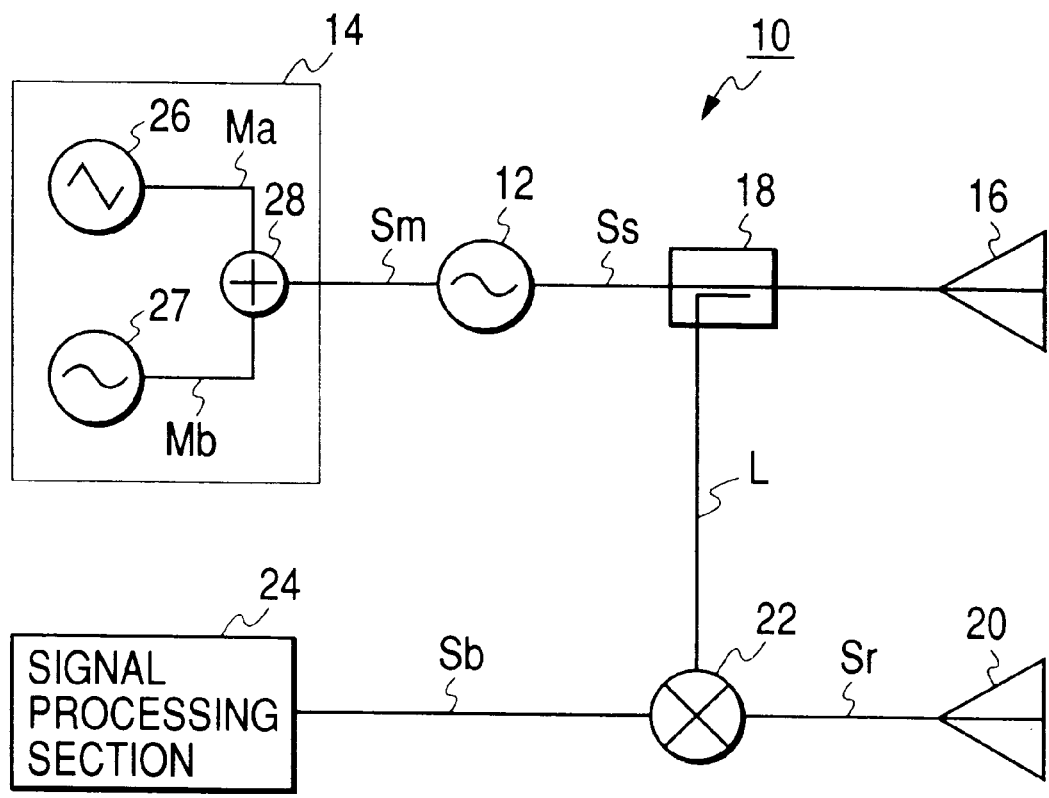
FIG. 1 is a schematic block diagram showing an arrangement of a radar system in accordance with a first embodiment of the present invention.

Hereinafter preferred embodiments of the present invention will be explained with reference to accompanying drawings. Identical parts are denoted by same reference numerals throughout the views.

First Embodiment

FIG. 1 shows an overall arrangement of an obstacle detecting radar system in accordance with a first embodiment of the present invention. As shown in FIG. 1, a radar system 10 comprises a voltage-controlled oscillator 12 whose frequency of oscillation can be generally varied by changing an applied voltage. More specifically, the voltage-controlled oscillator 12 produces a higher-frequency signal of a millimeter wave band as a transmitting signal Ss, and controls the frequency of the higher-frequency signal Ss in accordance with a modulation signal Sm. A modulation signal generator 14 is connected to the voltage-controlled oscillator 12 to produce the modulation signal Sm and supply it to the voltage-controlled oscillator 12. A transmitter antenna 16 emits a radar wave in response to the transmitting signal Ss produced from the voltage-controlled oscillator 12.

A distributor 18 is interposed between the voltage-controlled oscillator 12 and the transmitter antenna 16. The distributor 18 produces a local signal L by separating part of electric power of the transmitting signal Ss produced from the voltage-controlled oscillator 12.

A receiver antenna 20 receives the radar wave reflected from a target object, and converts the received radar wave into a received signal Sr. A high-frequency mixer 22 is connected to the receiver antenna 20 and receives the local signal L supplied from the distributor 18. The high-frequency mixer 22 mixes the received signal Sr with the local signal L, and produces a beat signal Sb which is equivalent to a difference between the received signal Sr and the local signal L. A signal processing section 24 is connected to the high-frequency mixer 22 to receive the beat signal Sb sent from the high-frequency mixer 22. The signal processing section 24 detects a distance and a relative velocity of the target object based on the beat signal Sb sent from the mixer 22.

The modulation signal generator 14 comprises a triangular wave oscillator 26, a sine wave oscillator 27, and a signal adder 28. The triangular wave oscillator 26 generates a linear modulation signal Ma having a triangular waveform with a cyclic period T. When this linear modulation signal Ma is supplied, the voltage-controlled oscillator 12 performs a modulation in such a manner that the modulation frequency once increases linearly relative to time and then decreases reversely. The sine wave oscillator 27 produces a cyclic modulation signal Mb of a sine waveform with a cyclic period 1/Fs. When this cyclic modulation signal Mb is supplied, the voltage-controlled oscillator 12 performs another modulation in such a manner that the frequency varies cyclically with a cyclic period sufficiently shorter than that of the cyclic period T of the triangular waveform. The signal adder 28 is interposed between the triangular wave oscillator 26 and the sine wave oscillator 27 to produce the modulation signal Sm. Namely, the linear modulation signal Ma supplied from the triangular wave oscillator 26 is added with the cyclic modulation signal Mb supplied from the sine wave oscillator 27, to form the modulation signal Sm produced from the modulation signal generator 14 and supplied to the voltage-controlled oscillator 12.

The signal processing section 24 comprises a microcomputer, serving as a main component, which is usually constituted by a combination of CPU, ROM and RAM. The signal processing section 24 further comprises an A/D converter which converts the beat signal Sb into a corresponding digital signal for entering it into the CPU, and an arithmetic processing unit for performing a fast Fourier transform (FFT) based on the data fetched through the A/D converter.

According to the above-described radar system 10, the voltage-controlled oscillator 12 produces the transmitting signal Ss as a result of the frequency modulation in accordance with the modulation signal Sm entered from the modulation signal generator 14.

Figure 2:
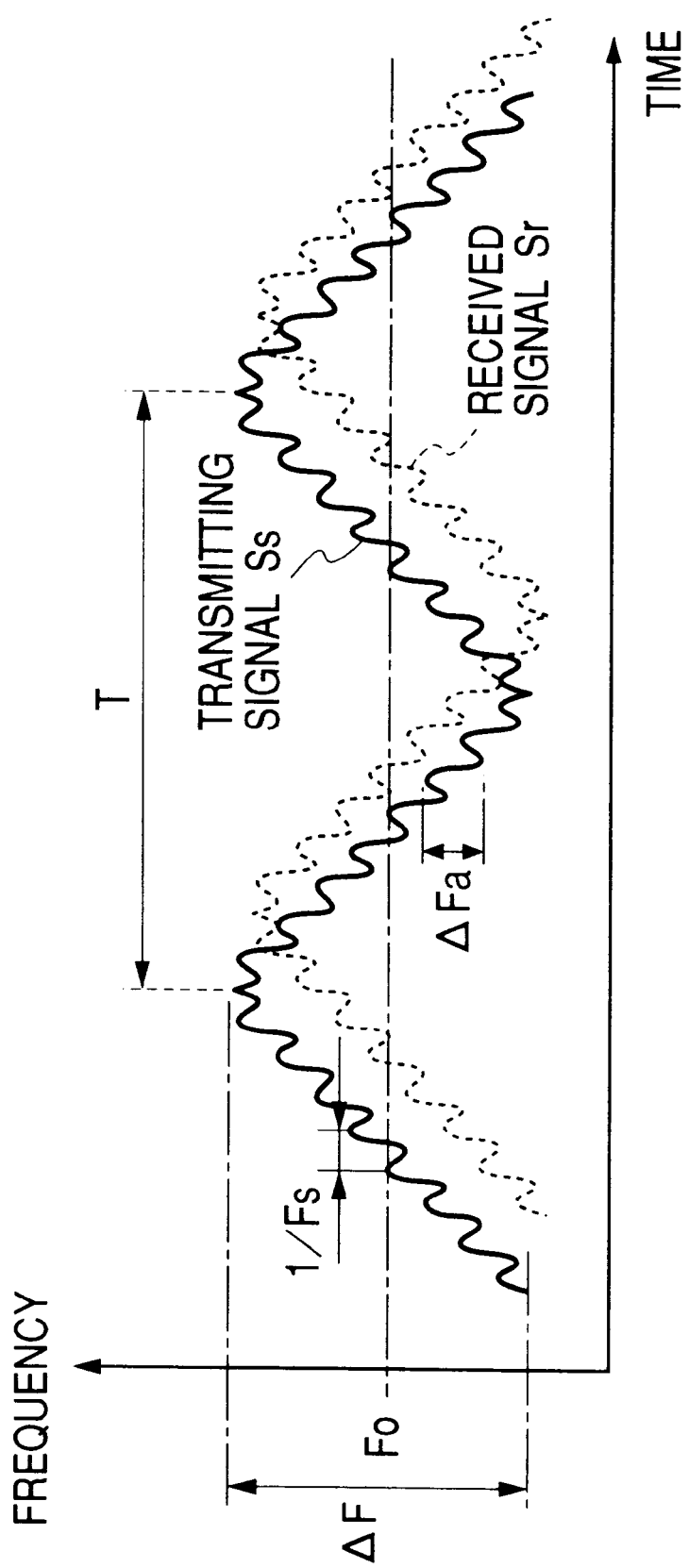
FIG. 2 is a time chart showing a waveform of a transmitting signal and a waveform of a received signal.

In FIG. 2, a solid line represents a variation in the frequency of the transmitting signal Ss. The configuration of the solid line is substantially a combination of a triangular waveform and a sine waveform added thereon. The triangular waveform is the linear modulation signal Ma varying with the cyclic period of T, while the sine waveform is the cyclic modulation signal Mb varying with the frequency Fs.

Then, the transmitter antenna 16 sends the transmitting signal Ss carried on a radar wave. The distributor 18 separates part of the transmitting signal Ss as the local signal L. The receiver antenna 20 receives the radar wave emitted from the transmitter antenna 16 and then reflected from the target object. In FIG. 2, a dotted line shows a frequency variation of the receiver signal Sr. The high-frequency mixer 22 mixes the received signal Sr produced from the receiver antenna 20 with the local signal L supplied from the distributor 18, and produces the beat signal Sb.

The signal processing section 24 inputs A/D converted data of the beat signal Sb in relation to each of the ascendant modulation part and the descendant modulation part of the transmitting signal Ss. Then, the signal processing section 24 carries out the fast Fourier transform to obtain a spectrum of the beat signal Sb. Then, from the resulting spectrum, an ascendant modulation frequency Fs±fu and a descendant modulation frequency Fs±fd are extracted, respectively. Furthermore, the beat frequencies fu and fd are obtained from thus extracted frequencies Fs±fu and Fs±fd. Subsequently, based on the beat frequencies fu and fd thus obtained, the processing for obtaining the distance R and the relative velocity V of the target object are executed using the equations (1) and (2).

Figure 3:
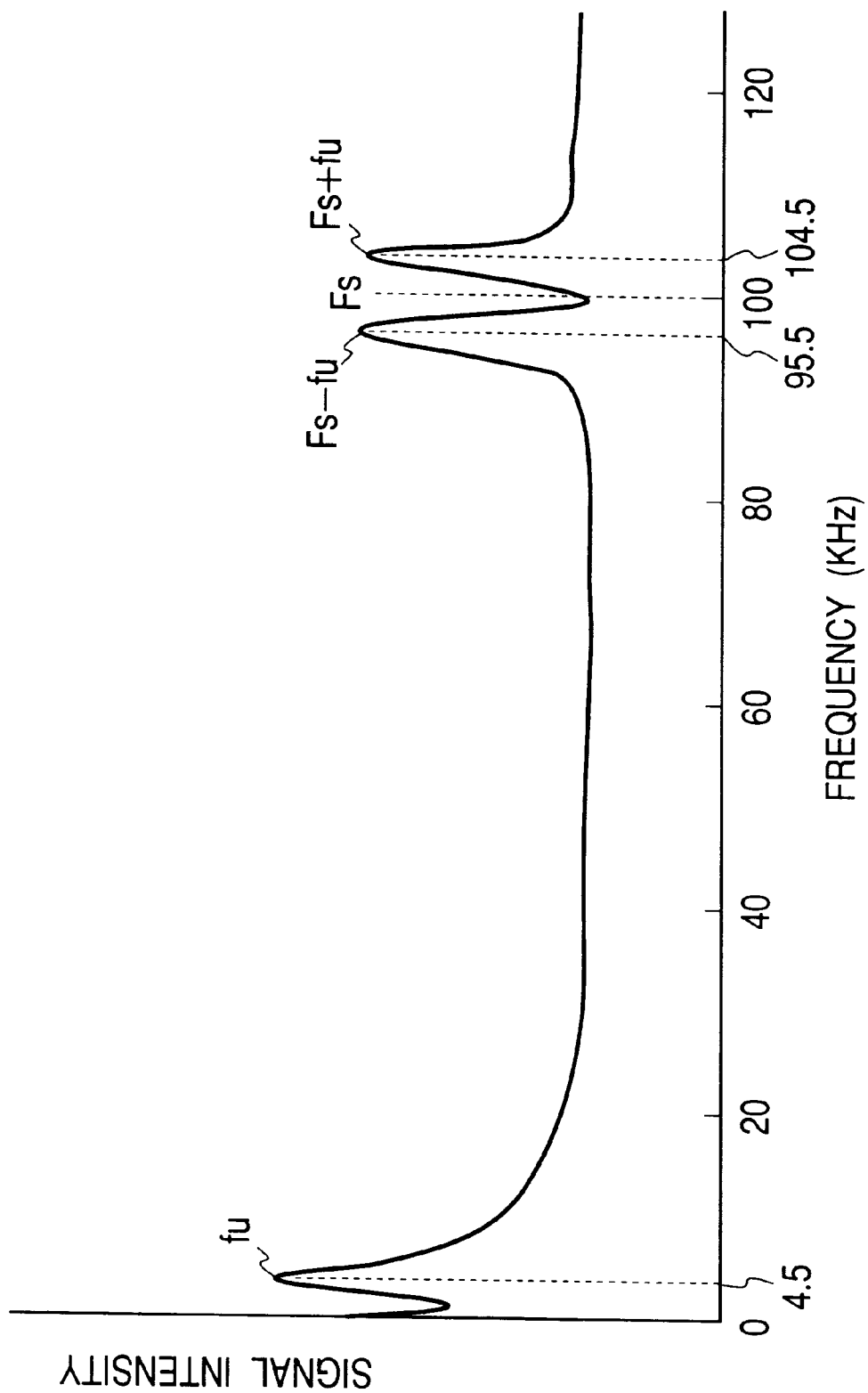
FIG. 3 is a chart showing a spectrum of a measured beat signal.

FIG. 3 shows a measured spectrum of the beat signal Sb produced from the high-frequency mixer 22 which received a radar wave reflected from the target object placed 10 m ahead of the radar system 10.

The linear modulation signal Ma, produced from the triangular wave oscillator 26, is a triangular wave with cyclic period T=2.7 msec (corresponding to a frequency of 370 Hz). A modulation band width ΔF of the transmitting signal Ss is set to 90 MHz, while a central frequency Fo of the transmitting signal Ss is set to 59.5 Ghz. The cyclic modulation signal Mb, produced from the sine wave oscillator 27, is a sine wave with frequency Fs=100 kHz. A modulation band width ΔFa of the transmitting signal Ss relative to a variation of the cyclic modulation signal Mb is set to 4 MHz.

Furthermore, according to this measurement, both the radar system 10 and the target object are stationary. The ascendant beat signal fu of the transmitting signal Ss is substantially identical with the descendant beat signal fd of the transmitting signal Ss. The spectrum of the beat signal remains unchanged during the ascendant modulation and the descendant modulation. Accordingly, FIG. 3 shows only the spectrum of the ascendant beat signal Sb.

As shown in FIG. 3, the spectrum of the beat signal Sb has a peak of the fundamental wave component at a frequency fu (4.5 kHz), as well as peaks of higher harmonic components at 95.5 kHz and 104.5 kHz. These peaks coincide with Fs±fu, i.e., frequency Fs (=100 kHz) of the cyclic modulation signal Mb plus or minus beat frequency fu. In other words, this measurement demonstrates that demodulating the transmitting signal Ss by the modulation signal Sm makes it possible to produce the higher harmonic components (frequency: n×Fs±fu) together with the fundamental wave component (corresponding to the frequency fu). As described above, the modulation signal Sm is formed by adding the linear modulation signal Ma and the cyclic modulation signal Mb.

Furthermore, in order to realize a distinctive display of the spectrum, this measurement used the low frequency of 100 kHz as the frequency Fs of the cyclic modulation signal Mb produced from the sine wave oscillator 27. However, in view of noise reduction, a practical value of the frequency Fs of the cyclic modulation signal Mb should be set to a higher frequency range of 1 MHz to 10 MHz. Setting a higher frequency Fs is especially effective to eliminate the influence of low frequency noises. The peaks of higher harmonic components (frequency:n×Fs±fu) appear in a region capable of obtaining a better S/N ratio.

As explained above, according to the radar system 10 of the first embodiment, the modulation signal Sm used for modulating the transmitting signal Ss is composed of the linear modulation signal Ma and the cyclic modulation signal Mb. The transmitting signal Ss not only varies linearly but also varies cyclically (with the cyclic period=1/Fs). Part of the transmitting signal Ss is distributed as the local signal L. The received signal Sr is mixed with this local signal L by the higher-frequency mixer 22. The higher-frequency mixer 22 produces the beat signal Sb comprising the fundamental wave component (corresponding to the frequency fu) as well as higher harmonic components (corresponding to the frequencies n×Fs±fu).

Accordingly, to suppress the adverse influence of the low frequency noises in the radar system 10 of the first embodiment, it is preferable to set the frequency Fs of the cyclic modulation signal Mb to a range equivalent to several MHz to several tens MHz. The higher harmonic components of the beat signal is substantial free from the adverse influence of the low-frequency noises. Thus, the higher harmonic components of the beat signal are excellent in their S/N ratios compared with the fundamental wave component of the beat signal. Using such higher harmonic components excellent in their S/N ratios in the arithmetic operations carried out in the signal processing section 24 makes it possible to detect the beat frequencies fu and fd accurately. The distance and/or relative velocity of the target object can be accurately obtained.

For example, it is assumed that the frequency Fs of the cyclic modulation signal Mb is 1 MHz and the beat frequency fu is 10 kHz. The higher harmonic components (Fs±fu) would be 0.99 MHz and 1.01 MHZ. Detecting the higher harmonic components in such a case is effective compared with directly detecting the fundamental wave component (fu=10 kHz) in that the 1/f noise can be reduced by 20 dB. This is equivalent to a drastic reduction in the noise level to approximately 1/100. The 1/f noise is one of the low frequency noises and inverse proportion to the frequency.

Figure 4:
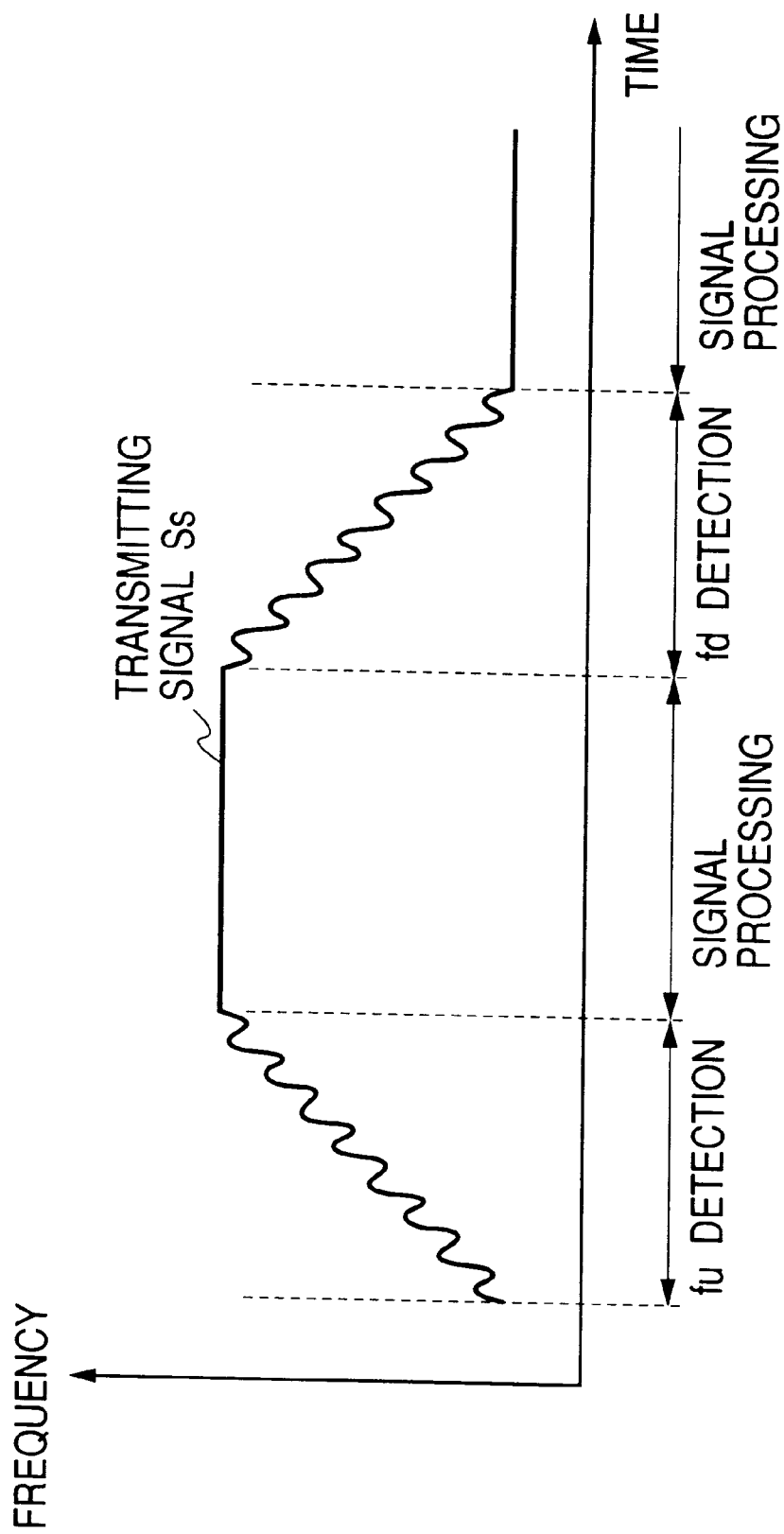
FIG. 4 is a time chart showing another waveform of the transmitting signal according to another signal transmitting method.

According to the modulation signal generator 14 of the above-described first embodiment, the triangular wave oscillator 26 and the sine wave oscillator 27 continuously produce triangular waves and sine waves, respectively. However, the method for transmitting the transmitting signal Ss is not limited to the one disclosed in FIG. 2. For example, FIG. 4 shows the waveform of a modified transmitting signal Ss. As shown in FIG. 4, the modified transmitting signal Ss has a dormant period interposed between its ascendant modulation period and descendant modulation period. During this dormant period, the triangular wave oscillator 26 produces a constant output and the sine wave oscillator 27 is deactivated so that the frequency of the transmitting signal Ss remains constant. A purpose of setting the dormant period is securing a sufficient time for processing or analyzing the beat signal Sb as well as calculating the distance and/or relative velocity of the target object. If the radar system 10 is installed in an automotive vehicle as a device for preventing any collision, the dormant period will be effectively used for performing necessary controls of related vehicle apparatus, such as a vehicle speed control and/or a braking control, as well as generating alarms to a driver.

According to the above-described first embodiment, the cyclic modulation signal Mb is a sine wave. However, the cyclic modulation signal Mb can be a rectangular or triangular wave when it can causes a cyclic variation in the frequency of the transmitting signal Ss.

Furthermore, according to the above-described first embodiment, the modulation signal generator 14 comprises the triangular wave oscillator 26, the sine wave oscillator 27 and the signal adder 28 for producing the modulation signal Sm. However, when the signal processing section 24 has a capability of producing the comparative waveform data, it will become possible to produce the modulation signal Sm by performing a D/A conversion of the produced waveform data. Moreover, it will be possible to arrange or unite the modulation signal generator 14 and the voltage-controlled oscillator 12 into an integrated module.

Second Embodiment

Figure 5:
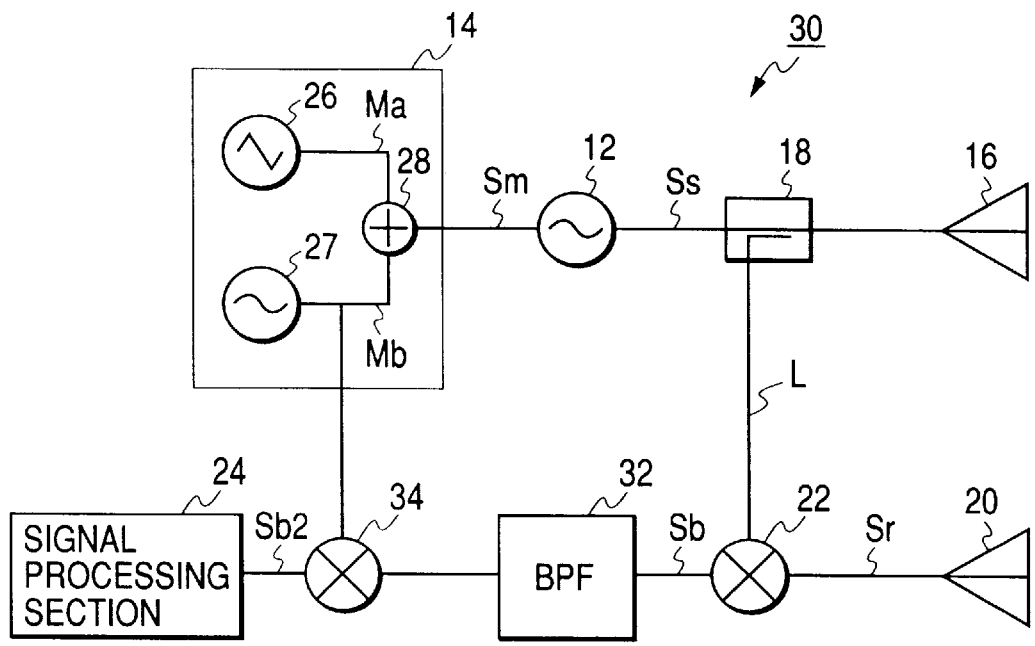
FIG. 5 is a schematic block diagram showing an arrangement of a radar system in accordance with a second embodiment of the present invention.

FIG. 5 shows an overall arrangement of a radar system 30 in accordance with a second embodiment of the present invention.

The radar system 30 of the second embodiment comprises a band-pass filter (BPF) 32 and an intermediate-frequency mixer 34 in addition to the arrangement of the radar system 10 shown in the first embodiment. The band-pass filter (BPF) 32 and the intermediate-frequency mixer 34 are serially interposed between the high-frequency mixer 22 and the signal processing section 24. The beat signal Sb, produced from the high-frequency mixer 22, is sent to the band-pass filter 32. The band-pass filter 32 extracts only higher harmonic components of a predetermined frequency band from the entered beat signal Sb. Thus, the selected higher harmonic components are exclusively sent to the intermediate-frequency mixer 34. The intermediate-frequency mixer 34 produces a second beat signal Sb2 by mixing the selected higher harmonic components with the cyclic modulation signal Mb sent from the sine wave oscillator 27.

The frequency band of band-pass filter 32 has a central frequency identical with the frequency Fs of the cyclic modulation signal Mb with a band width wider than two times the maximum value of a detectable beat frequency.

Figure 25:
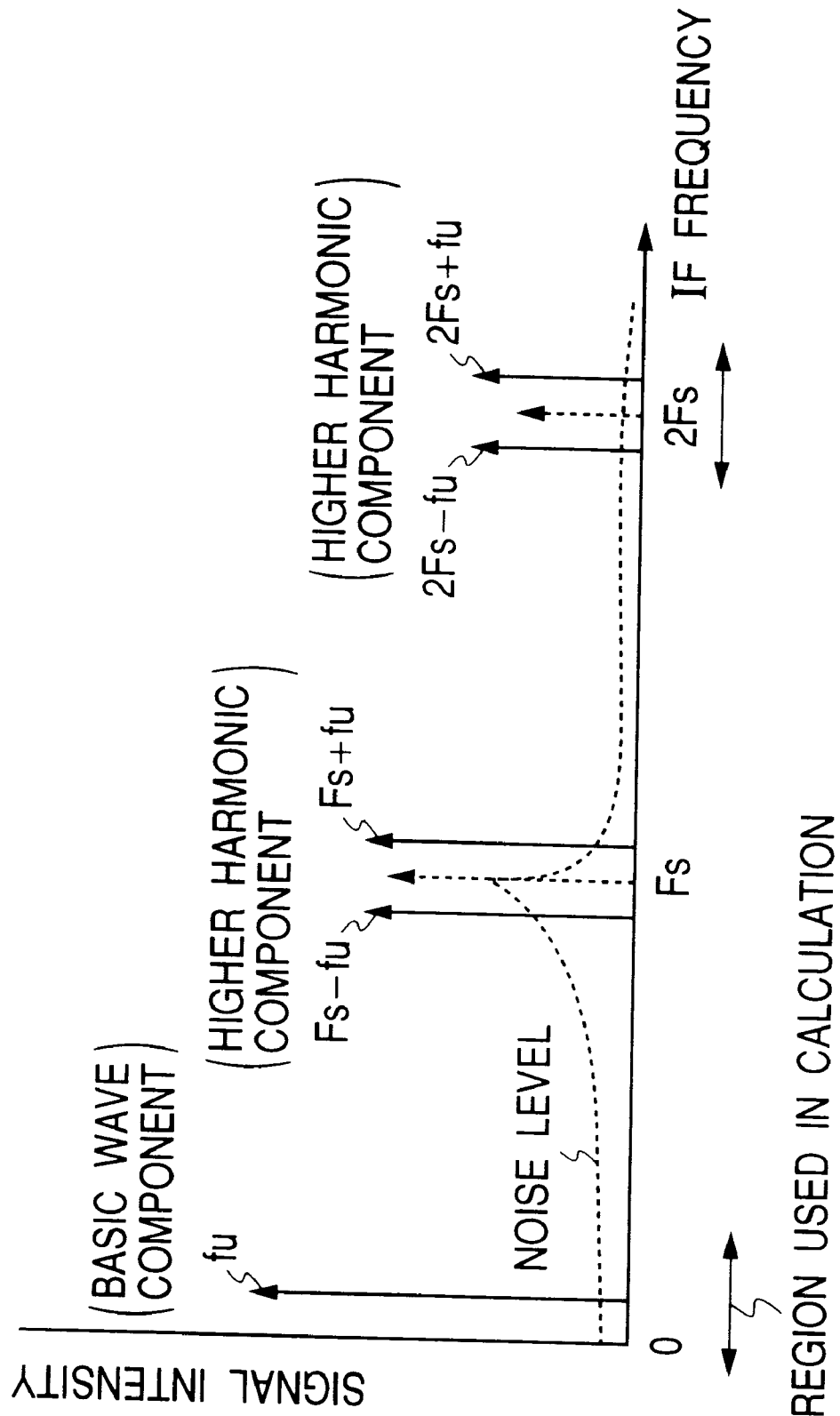
FIG. 25 is a view explaining an effect of providing an intermediate-frequency mixer in accordance with the first aspect of the present invention.
Figure 26:
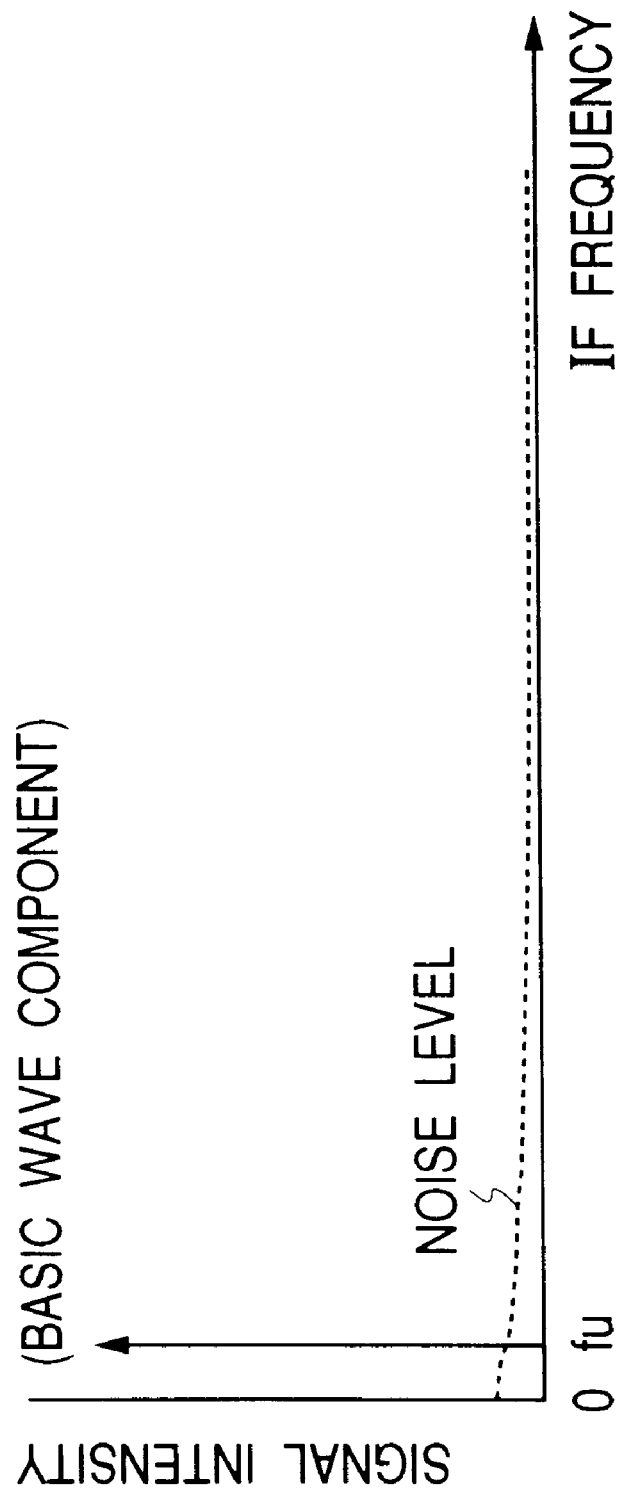
FIG. 26 is a view explaining an effect of providing a band-pass filter in accordance with the first aspect of the present invention.

According to the above-described arrangement, the radar system 30 of the second embodiment extracts only the higher harmonic components having the frequencies of Fs±fu from the entered beat signal Sb. The higher harmonic components having thus extracted are then mixed with the cyclic modulation signal Mb of frequency Fs. Thus, as previously explained with reference to FIGS. 25 and 26, the intermediate-frequency mixer 34 produces the second beat signal Sb2 composed of the fundamental wave component of the beat frequency fu.

Accordingly, the signal processing section 24 can carry out the required arithmetic operations using the signal component of the beat signal fu without any modification of its hardware or software arrangement.

For example, when the frequency Fs of the cyclic modulation signal Mb is set to 10.7 MHz, the band-pass filter 32 and the intermediate-frequency mixer 34 can be constituted by cheaper electronic components commercially available and widely used for the intermediate-frequency processing circuits incorporated in the conventional television sets and radio receivers. This realizes a significant cost reduction in manufacturing the radar system 30.

The second embodiment provides the band-pass filter 32 interposed between the high-frequency mixer 22 and the intermediate-frequency mixer 34. However, the provision of this band-pass filter 32 may be omitted if required.

Third Embodiment

Figure 6:
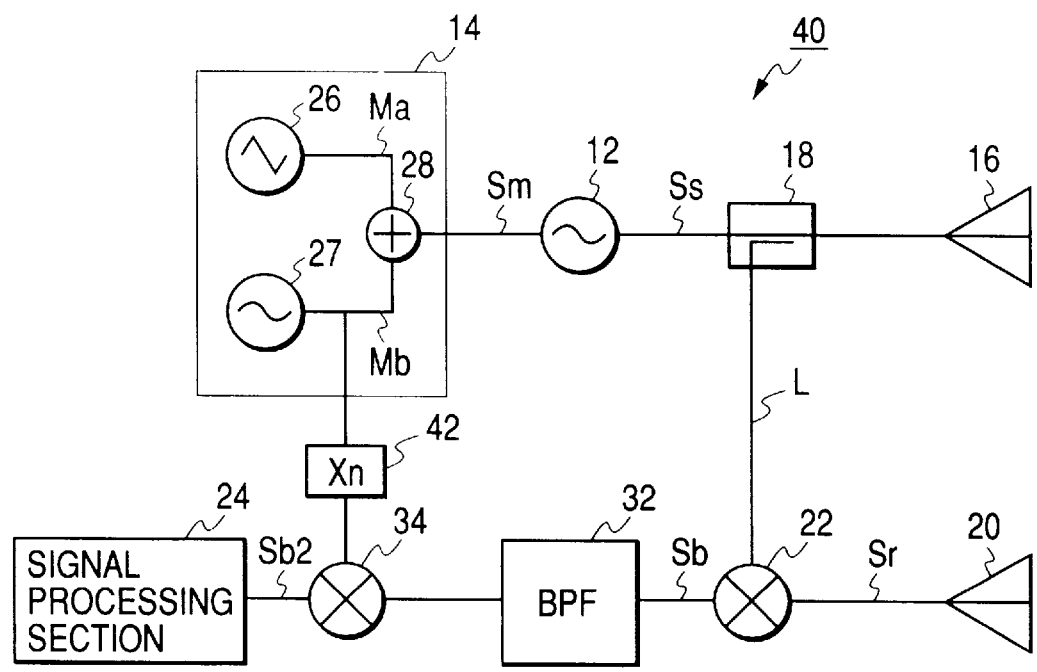
FIG. 6 is a schematic block diagram showing an arrangement of a radar system in accordance with a third embodiment of the present invention.

FIG. 6 shows an overall arrangement of a radar system 40 in accordance with a third embodiment of the present invention.

The radar system 40 of the third embodiment comprises a frequency multiplier 42 in addition to the arrangement of the radar system 30 shown in the second embodiment. The frequency multiplier 42 is interposed between the intermediate-frequency mixer 34 and the sine wave oscillator 27 to perform an n times frequency multiplication for the cyclic modulation signal Mb supplied from the sine wave oscillator 27.

In this third embodiment, the band-pass filter 32 has a frequency band centered at a frequency identical with n times the frequency Fs of the cyclic modulation signal Mb with a band width wider than two times the maximum value of a detectable beat frequency.

According to the above-described arrangement, the radar system 40 of the third embodiment extracts the harmonic components having the frequencies of n×Fs±fu from the entered beat signal Sb. The harmonic components having thus extracted are then mixed with the frequency multiplied cyclic modulation signal Mb having a multiplied frequency equivalent to n times Fs. Thus, the intermediate-frequency mixer 34 produces the second beat signal Sb2 comprising the fundamental wave component of the beat frequency fu.

The radar system 40 of the third embodiment optimizes the multiplication number "n" of the frequency multiplier 42 and the frequency band of the band-pass filter 32, so as to convert only limited frequency components having excellent S/N ratios into the fundamental wave component (frequency fu) of the second beat signal Sb2.

The third embodiment provides the band-pass filter 32 interposed between the high-frequency mixer 22 and the intermediate-frequency mixer 34. However, the provision of this band-pass filter 32 may be omitted if required.

Fourth Embodiment

Figure 7:
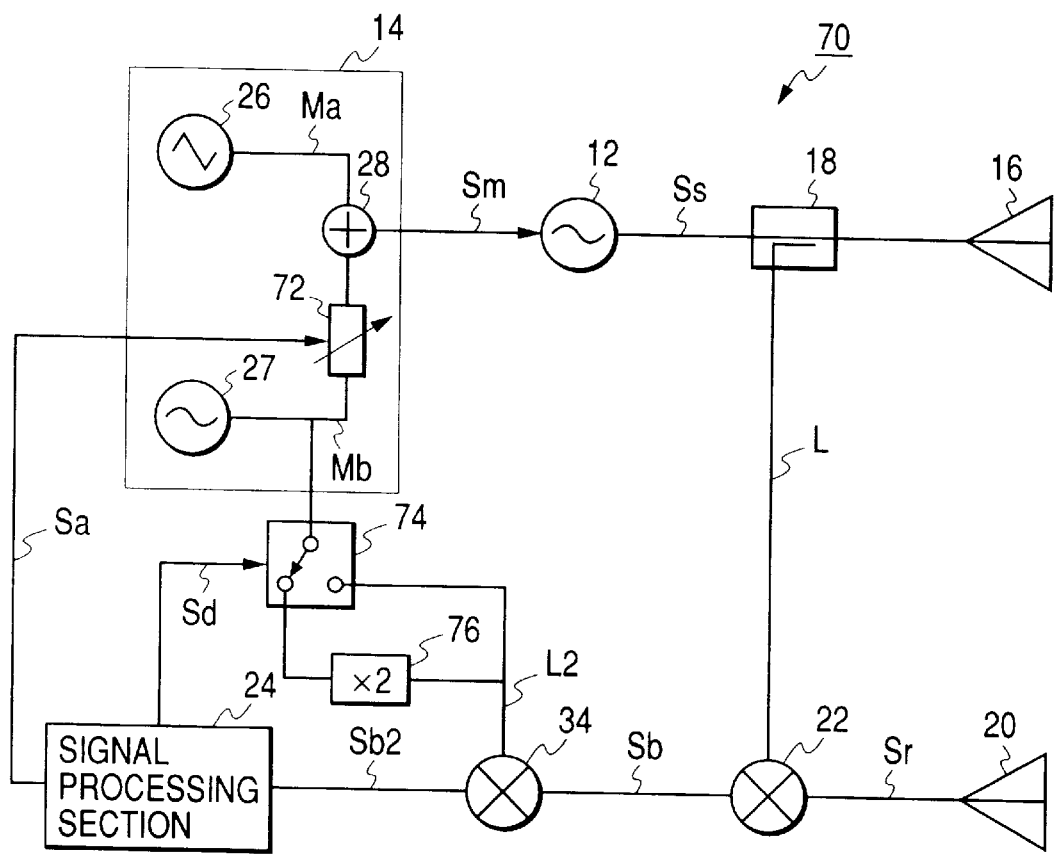
FIG. 7 is a schematic block diagram showing an arrangement of a radar system in accordance with a fourth embodiment of the present invention.

FIG. 7 shows an overall arrangement of a radar system 70 in accordance with a fourth embodiment of the present invention.

The radar system 70 of the fourth embodiment comprises an intensity adjuster 72, an intermediate-frequency mixer 34, a frequency multiplier 76 and a second local signal switching circuit 74 in addition to the arrangement of the radar system 10 shown in the first embodiment.

The intensity adjuster 72 is interposed between the sine wave oscillator 27 and the signal adder 28, and receives an intensity adjusting signal Sa supplied from the signal processing section 24. More specifically, the intensity adjuster 72 changes a signal intensity (i.e., amplitude) of the cyclic modulation signal Mb supplied from the sine wave oscillator 27 in accordance with the intensity adjusting signal Sa supplied from the signal processing section 24. The intermediate-frequency mixer 34 is interposed between the high-frequency mixer 22 and the signal processing section 24 to produce a second beat signal Sb2 by mixing the beat signal Sb supplied from the high-frequency mixer 22 with a later-described second local signal L2.

The frequency multiplier 76 is connected to the intermediate-frequency mixer 34 to double the frequency of the cyclic modulation signal Mb supplied from the sine wave oscillator 27.

The second local signal switching circuit 74 is disposed between the sine wave oscillator 27 and the intermediate-frequency mixer 34, with only one input terminal connected to the sine wave oscillator 27 and two output terminals selectively connected to the input terminal via a movable contact. A primary output terminal of the second local signal switching circuit 74 is directly connected to the intermediate-frequency mixer 34. A secondary output terminal of the second local signal switching circuit 74 is indirectly connected to the intermediate-frequency mixer 34 via the frequency multiplier 76. Furthermore, the second local signal switching circuit 74 receives a switching signal Sd from the signal processing section 24.

With this arrangement, the second local signal switching circuit 74 is selectively switched in accordance with the switching signal Sd supplied from the signal processing section 24, and changes the second local signal L2 between two. More specifically, when the movable contact of the second local signal switching circuit 74 is connected to the primary output terminal, the cyclic modulation signal Mb of the sine wave oscillator 27 is directly supplied, as the second local signal L2, to the intermediate-frequency mixer 34. On the other hand, when the movable contact of the second local signal switching circuit 74 is connected to the secondary output terminal, the cyclic modulation signal Mb of the sine wave oscillator 27 is subjected to a two times frequency multiplication in the frequency multiplier 76 and then supplied, as the second local signal L2, to the intermediate-frequency mixer 34.

The intensity adjuster 72 of the fourth embodiment can be constituted by an appropriate amplifier or a variable resistor.

Figure 27B:
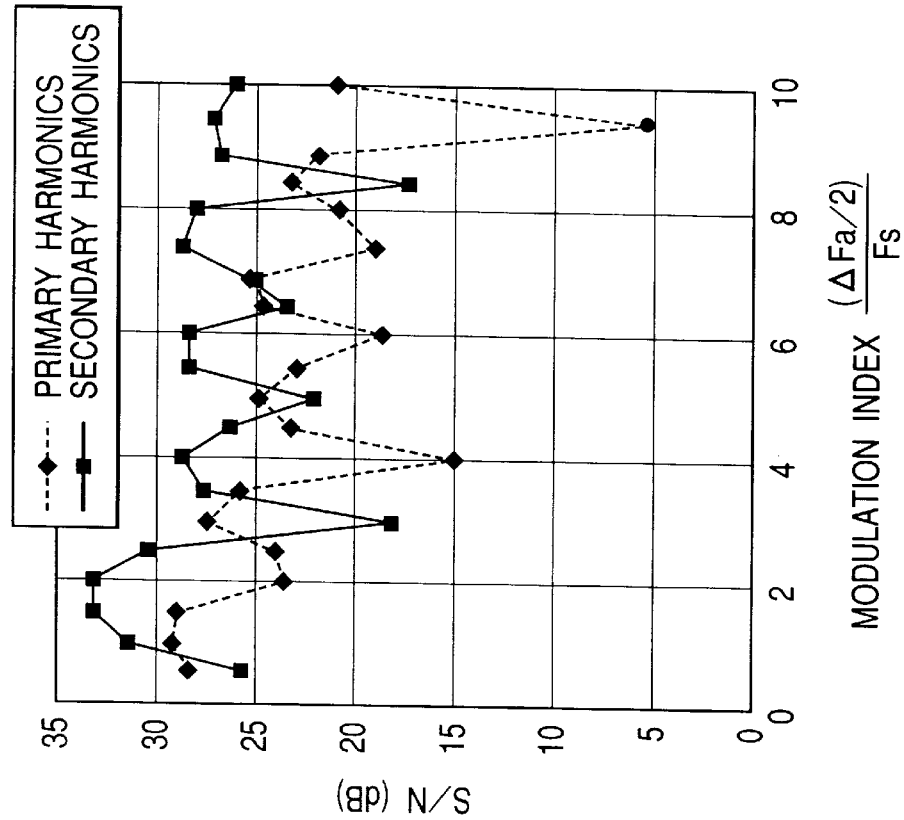
FIGS. 27A and 27B are graphs showing a relationship between the intensity of higher harmonic components and a modulation index and a relationship between the S/N ratio and the modulation index, respectively.
Figure 27A:
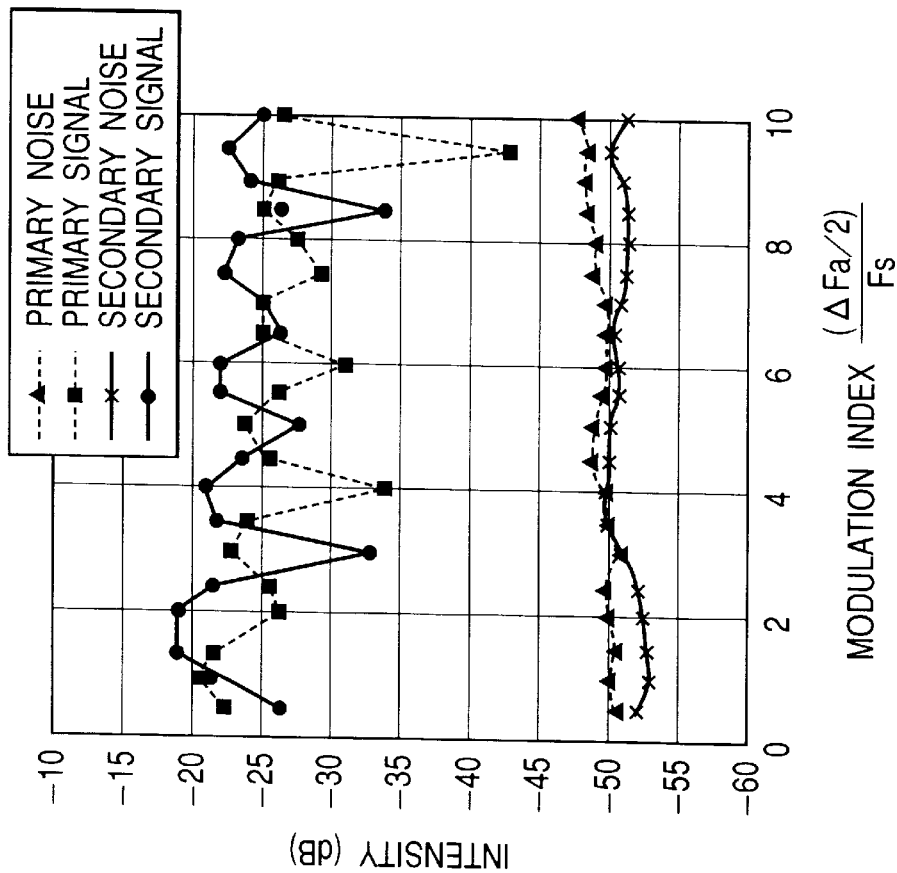

As apparent from the foregoing description, the radar system 70 of the fourth embodiment uses the intensity adjusting signal Sa to control the intensity adjustor 72. The intensity adjustor 72 changes the intensity of the cyclic modulation signal Mb in accordance with the intensity adjusting signal Sa, and sends an intensity-adjusted cyclic modulation signal Mb to the signal adder 28. This adjustment gives an influence to the beat signal Sb produced from the high-frequency mixer 22. The intensity of each harmonic component of the beat signal Sb varies in response to this adjustment, as previously shown in FIG. 27A.

Furthermore, the radar system 70 of the fourth embodiment uses the switching signal Sd to control the second local signal switching circuit 74. When the second local signal switching circuit 74 is set for detecting primary harmonic components, the cyclic modulation signal Mb is directly supplied from the sine wave oscillator 27 to the intermediate-frequency mixer 34. The primary harmonic components (i.e., Fs±fu) of the beat signal Sb produced from the higher-frequency mixer 22 are thus converted into the fundamental wave component of the second beat signal Sb2 (i.e., frequency fu) and supplied to the signal processing section 24.

On the other hand, when the second local signal switching circuit 74 is switched for detecting secondary harmonic components, the two times cyclic modulation signal is supplied from the frequency multiplier 76 to the intermediate-frequency mixer 34. The secondary harmonic components (i.e., 2Fs±fu) of the beat signal Sb are thus converted into the fundamental wave component of the second beat signal Sb2 and supplied to the signal processing section 24.

The signal processing section 24 performs an adjustment for determining the settings of the second local signal switching circuit 74 and the intensity adjustor 72. The adjusting processing performed, periodically or occasionally, in the signal processing section 24 will be explained hereinafter with reference to a flowchart shown in FIG. 8.

In a first step S110, the second local signal switching circuit 74 is set for detecting the primary harmonic components in response to the switching signal Sd. In a next step S120, an S/N ratio measuring processing is carried out. In this S/N ratio measuring processing, the S/N ratio of the second beat signal Sb2 entered in the signal processing section 24 is successively measured by varying the intensity of the intensity adjustor 72 to detect a peak value (i.e., maximum value) SNp. An intensity of the intensity adjustor 72, being set when the peak value is detected, is obtained as a peak intensity SAp.

Figure 9:
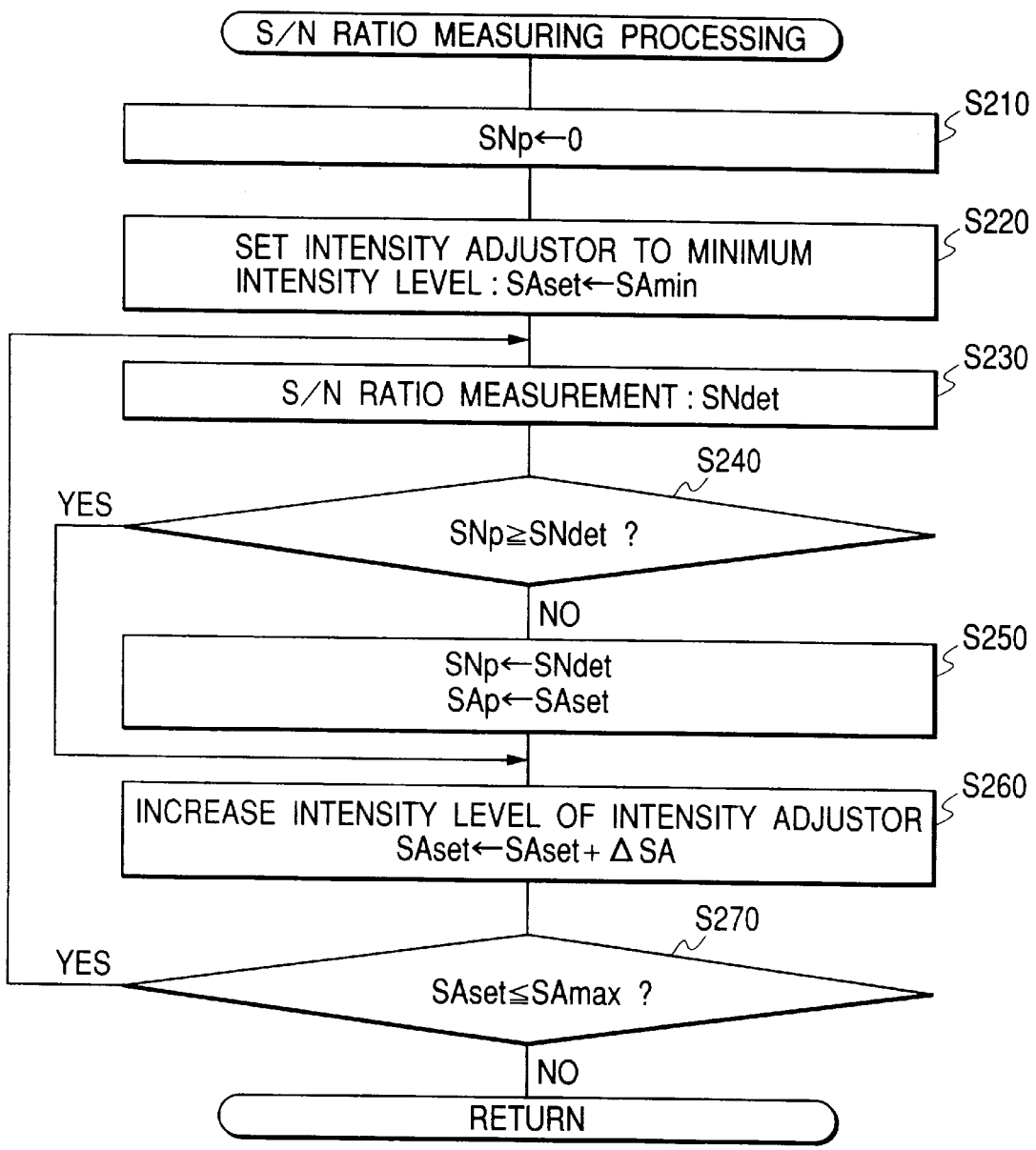
FIG. 9 is a flowchart showing details of S/N ratio measuring processing in accordance with the fourth embodiment of the present invention.

Details of the S/N ratio measuring processing performed in the step S120 will be explained with reference to a flowchart shown in FIG. 9.

In a step S210, a peak value SNp of the S/N ratio stored in a register is cleared. In a next step S220, in response to the intensity adjusting signal Sa, an intensity setting SAset of the intensity adjustor 72 is set to SAmin which is an adjustable minimum value.

Next, a step S230 performs an S/N ratio measurement and obtains a measured value SNdet, which is the S/N ratio of the fundamental wave component of the second beat signal Sb2 entered in the signal processing section 24. Then, in a step S240, a judgement is made to check whether the measured value SNdet is smaller than the peak value SNp. When the judgement result is YES (i.e., SNp≧SNdet) in step S240, the control flow proceeds to a step S260. On the other hand, when the judgement result is NO (i.e., SNp<SNdet) in step S240, the control flow proceeds to a step S250. In step S250, the peak value SNp is replaced (i.e., renewed) by the measured value SNdet. And, a corresponding intensity setting SAset of the intensity adjustor 72 is memorized as the peak intensity Sap which is being set during the S/N ratio measurement of step S230. Then, the control flow proceeds to the step S260.

In step S260, in response to the intensity adjusting signal Sa, the intensity setting SAset of the intensity adjustor 72 is increased by a predetermined amount ΔSA (i.e., SAset←SAset+ΔSA). Then, in a next step S270, a judgement is made to check whether the increased intensity setting SAset is smaller than an adjustable maximum value SAmax of the intensity adjustor 72. When the judgement result is YES (i.e., SAset≦SAmax) in step S270, the control flow returns to the step S230 and repeats the above-described steps S230 through S270. On the other hand, when the judgement result is NO (i.e., SAset>SAmax) in step S270, the S/N ratio measuring processing is terminated and returned to the step S130 of the adjusting processing of FIG. 8. In short, the S/N ratio measuring processing obtains latest values of the peak value SNp of the S/N ratio and the corresponding peak intensity SAp.

In the step S130, the measured latest values of the peak value SNp and the peak intensity SAp are memorized as SN1 and SA1, respectively.

Next, in a step S140, the second local signal switching circuit 74 is set for detecting the secondary harmonic components in response to the switching signal Sd. In a next step S150, an S/N ratio measuring processing is carried out in the same manner as in step S120. Namely, in this S/N ratio measuring processing, the S/N ratio of the second beat signal Sb2 entered in the signal processing section 24 is successively measured by varying the intensity of the intensity adjustor 72 to detect a peak value (i.e., maximum value) SNp. An intensity of the intensity adjustor 72, being set when the peak value is detected, is obtained as a peak intensity SAp. In a next step S160, the measured latest peak values SNp and SAp are memorized as SN2 and SA2, respectively. Then, the control flow proceeds to a next step S170.

In this manner, a sequential processing of steps S110 through S130 obtains the peak value SN1 of the S/N ratio being set for detecting the primary harmonic components and a corresponding peak value SA1 of the intensity setting in the intensity adjustor 72. A sequential processing of steps S140 through S160 obtains the peak value SN2 of the S/N ratio being set for detecting the secondary harmonic components and a corresponding peak value SA2 of the intensity setting in the intensity adjustor 72.

In the step S170, a judgement is made to check whether the peak value SN1 is larger than the peak value SN2. When the judgement result is YES (i.e., SN1>SN2) in the step S170, the control flow proceeds to a step S180. In the step S180, signal processing section 24 sends the switching signal Sd to select the primary output terminal, thereby finally setting the second local signal switching circuit 74 for detecting the primary harmonic components. Furthermore, the signal processing section 24 sends the intensity adjusting signal Sa to the intensity adjustor 72 to finalize its setting to an optimum value so that the signal intensity of the cyclic modulation signal Mb, supplied to the signal adder 28, has a peak intensity SA1.

On the other hand, when the judgement result is NO (i.e., SN1≦SN2) in the step S170, the control flow proceeds to a step S190. In the step S190, signal processing section 24 sends the switching signal Sd to select the secondary output terminal, thereby finally setting the second local signal switching circuit 74 for detecting the secondary harmonic components. Furthermore, the signal processing section 24 sends the intensity adjusting signal Sa to the intensity adjustor 72 to finalize its setting to an optimum value so that the signal intensity of the cyclic modulation signal Mb, supplied to the signal adder 28, has a peak intensity SA2.

Hereinafter, the signal processing section 24 holds the settings finalized in the step S180 or S190, and carries out arithmetic processing for obtaining the distance and the relative velocity of the target object based on the frequency (i.e., beat frequency fu) of the fundamental wave component of the second beat signal Sb2.

As explained above, the radar apparatus 70 of the fourth embodiment compares the primary harmonic components (having frequencies of Fs±fu) and the secondary harmonic components (having frequencies of 2Fs±fu) when the beat signal Sb is supplied from the high-frequency mixer 22. Then, based on the comparison of their S/N ratios, either the primary harmonic components or the secondary harmonic components are selected as excellent harmonic components. The excellent harmonic components thus selected are then converted into the fundamental wave component of the second beat signal Sb2.

For example, when a noise appears in the vicinity of the frequency Fs of the cyclic modulation signal Mb, the primary harmonic components will have a worsened S/N ratio. In such a case, the fourth embodiment exclusively converts the secondary harmonic components of the beat signal Sb into the fundamental wave component of the second beat signal Sb2. On the contrary, when a noise appears in the vicinity of a frequency 2×Fs identical with two times the frequency Fs of the cyclic modulation signal Mb, the secondary harmonic components will have a worsened S/N ratio. In such a case, the fourth embodiment exclusively converts the primary harmonic components of the beat signal Sb into the fundamental wave component of the second beat signal Sb2. The harmonic components of the beat signal, thus converted into the fundamental wave component of the second beat signal Sb2, are then used in the arithmetic processing in the signal processing section 24.

As explained above, the radar system 70 of the fourth embodiment can always obtain excellent harmonic components, between the primary harmonic components and the secondary harmonic components, considering generation of noises (i.e., S/N ratio). Thus, high accuracy is maintained in the calculation of the distance and the relative velocity of the target object.

Furthermore, according to the fourth embodiment, the signal intensity of the cyclic modulation signal Mb is precisely adjustable so as to maximize the S/N ratio for each of the primary and secondary harmonic components. This leads to an improvement in the detection ability of the radar system 70.

Moreover, according to the fourth embodiment, the frequency multiplier 76 performs the two times frequency multiplication. However, the degree of the frequency multiplication is not limited to "double" and can be changed to "triple" or an appropriate other degree. Yet further, according to the fourth embodiment, the second local signal L2 is selected between two signals. However, it will be possible to provide two or more frequency multipliers 76 having different multiplication factors so that the second local signal L2 can be selected among three or more different frequencies.

Figure 10:
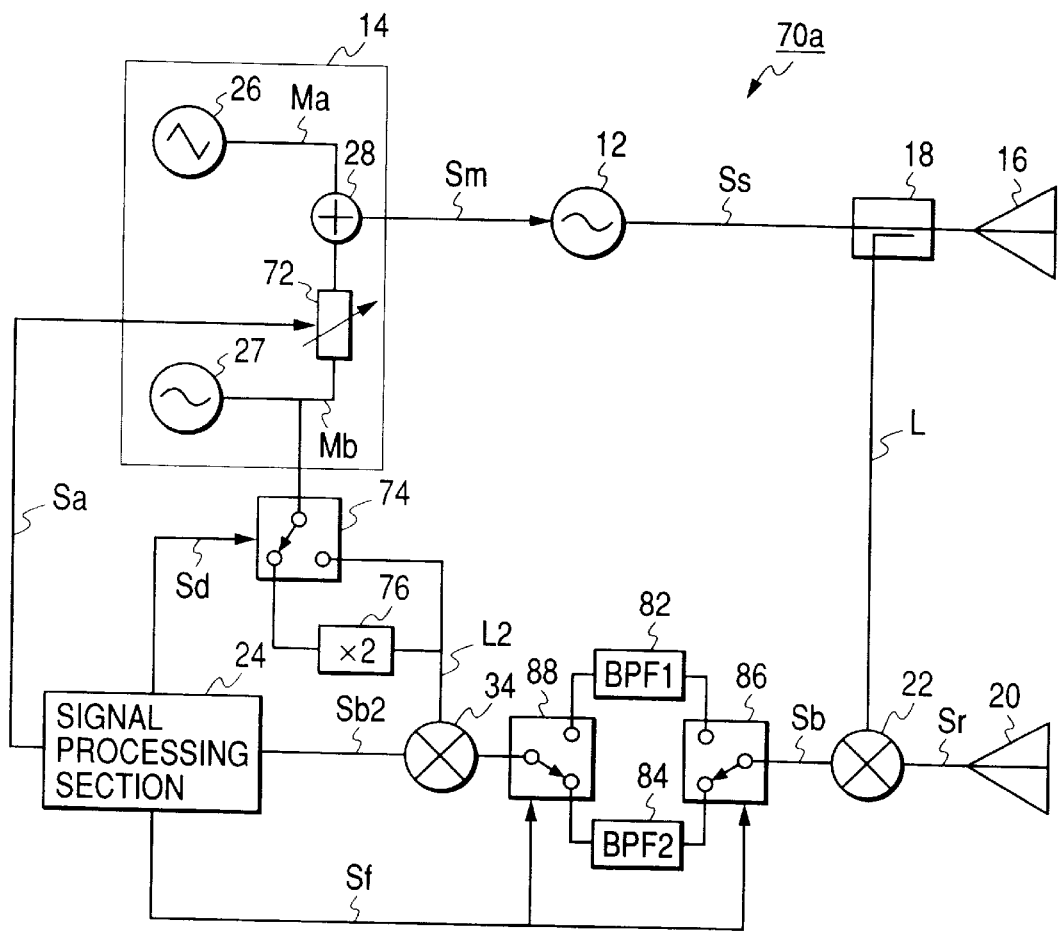
FIG. 10 is a schematic block diagram showing a modified arrangement of the radar system in accordance with the fourth embodiment of the present invention.

FIG. 10 shows a similar radar system 70a as a modification of the fourth embodiment of the present invention. The radar system 70a comprises a first band-pass filter (i.e., first BPF) 82, a second band-pass filter (i.e., second BPF) 84, and filter switching circuits 86 and 88 in addition to the arrangement of the radar system 70 shown in FIG. 7. The first BPF 82 and the second BPF 84 are disposed in parallel with each other between the high-frequency mixer 22 and the intermediate-frequency mixer 34. The first BPF 82 has a central frequency equal to the frequency Fs of the cyclic modulation signal Mb with a band width wider than two times the maximum value of a detectable beat frequency. The second BPF 84 has a central frequency equal to two times the frequency Fs of the cyclic modulation signal Mb with a band width wider than two times the maximum value of a detectable beat frequency.

The high-frequency mixer 22 is selectively connected the first BPF 82 or the second BPF 84 by the filter switching circuit 86 provided next to the high-frequency mixer 22. The intermediate-frequency mixer 34 is selectively connected the first BPF 82 or the second BPF 84 by the filter switching circuit 88 provided next to the intermediate-frequency mixer 34. The signal processing section 24 sends a filter switching signal Sf to both of the filter switching circuits 86 and 88 so as to cooperatively select one of the first BPF 82 and the second BPF 84.

The filter switching signal Sf is synchronized with the switching signal Sd. For detecting the primary harmonic components, the cyclic modulation signal Mb of the sine wave oscillator 27 is supplied to the intermediate-frequency mixer 34 via the primary output terminal of the second local signal switching circuit 74. In this case, the high-frequency mixer 22 is connected to the intermediate-frequency mixer 34 via the first BPF 82.

On the contrary, for detecting the secondary harmonic components, the cyclic modulation signal Mb of the sine wave oscillator 27 is supplied to the intermediate-frequency mixer 34 via the secondary output terminal of the second local signal switching circuit 74. In this case, the high-frequency mixer 22 is connected to the intermediate-frequency mixer 34 via the second BPF 84.

The circuit arrangement of the radar system 70a is preferable for removing various noise components from the beat signal Sb. The noise components to be removed, in this case, include the low-frequency noises as well as higher harmonic components not converted into the fundamental wave component (frequency fu). Thus, the S/N ratio of the beat signal Sb can be improved. Especially, the radar system 70a is functionally excellent when the fast Fourier transform (FFT) is used for the signal detection processing in the signal processing section 24.

It is well-known that signal components having frequencies larger than two times the to-be-detected frequency usually cause a circulating phenomenon of higher harmonics in the fast Fourier transform (FFT). Thus, by removing such undesirable higher harmonics, it becomes possible to eliminate errors in the detection of the target object.

Figure 8:
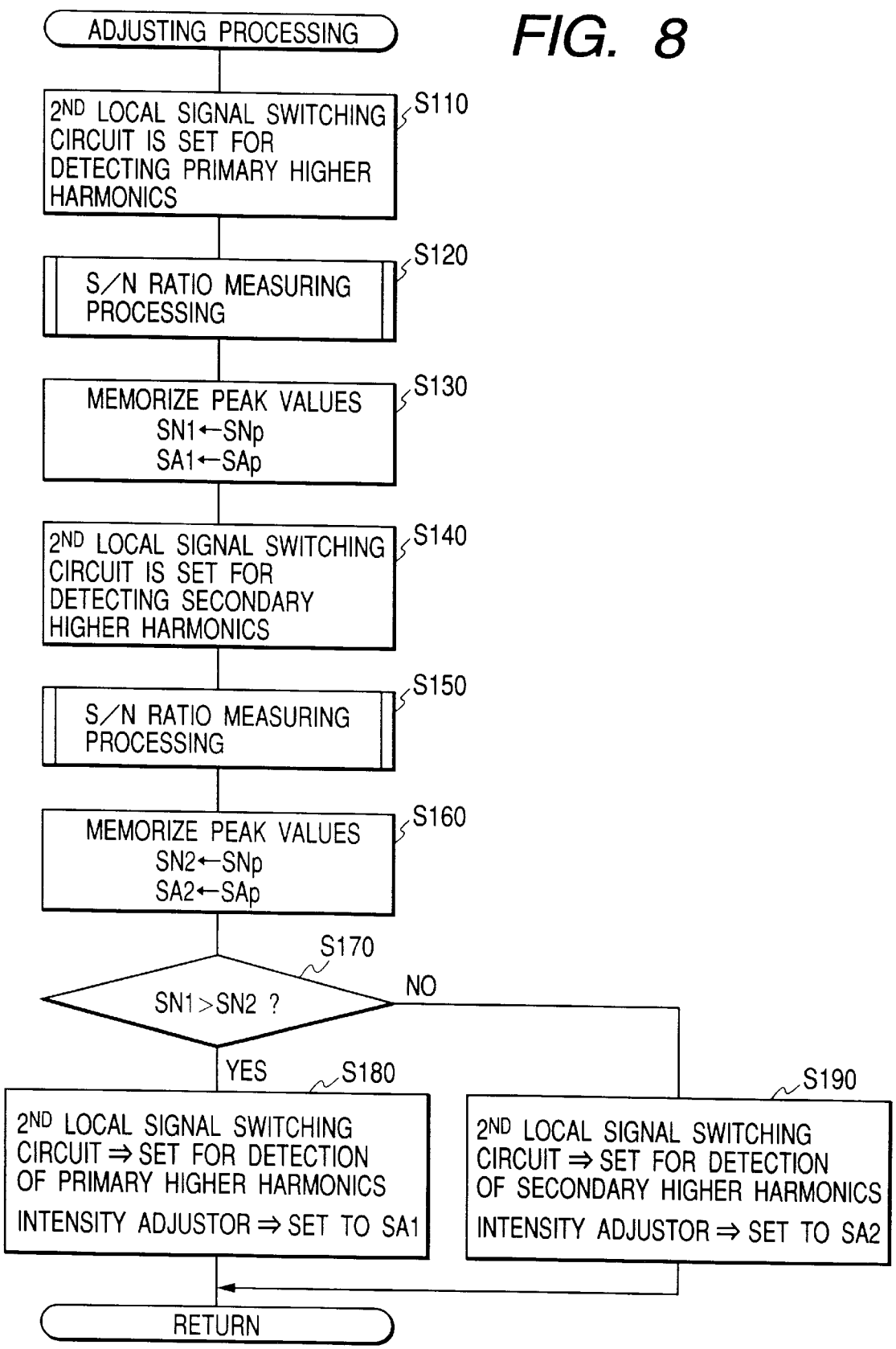
FIG. 8 is a flowchart showing an adjusting procedure in accordance with the fourth embodiment of the present invention.

An adjustment processing performed in the signal processing section 24 of the radar system 70a is substantially identical with that disclosed in the flowchart of FIG. 8, except that the settings of filter switching circuits 86 and 88 is performed by the filter switching signal Sf when the settings of the second local signal switching circuit 74 is carried out by the switching signal Sd (steps S110, S140, S180 and S190).

Fifth Embodiment

Figure 11:
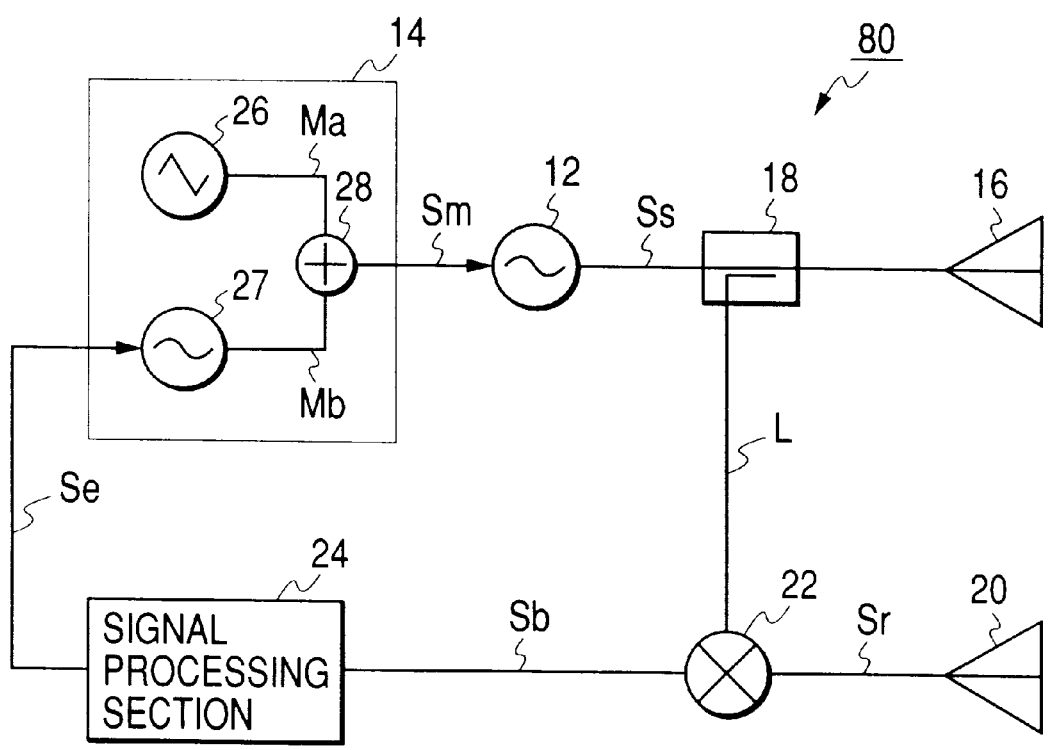
FIG. 11 is a schematic block diagram showing an arrangement of a radar system in accordance with a fifth embodiment of the present invention.

FIG. 11 shows an overall arrangement of a radar system 80 in accordance with a fifth embodiment of the present invention.

The radar system 80 of the fifth embodiment differs from the radar system 10 of the first embodiment in that the sine wave oscillator 27 is controlled by the signal processing section 24. More specifically, the signal processing section 24 sends a frequency adjusting signal Se to the sine wave oscillator 27. In response to this frequency adjusting signal Se, the sine wave oscillator 27 changes the frequency Fs of the cyclic modulation signal Mb. To realize this function, the sine wave oscillator 27 is preferably constituted as a voltage-controlled oscillator.

According to the above-described radar system 80 of the fifth embodiment, the frequency Fs of the cyclic modulation signal Mb varies in accordance with the frequency adjusting signal Se. The high-frequency mixer 22 produces the beat signal Sb having harmonic components having frequencies n×Fs±fu variable in response to the adjustment of the frequency Fs of the cyclic modulation signal Mb.

Next, an adjustment processing performed in the signal processing section 24 for determining the settings of the sine wave oscillator 27 will be explained with reference to a flowchart shown in FIG. 12. This processing is carried out periodically or occasionally.

In a first step S310, a peak value SNp of the S/N ratio stored in a register is cleared. In a next step S320, in response to the frequency adjusting signal Se, a frequency setting FMset of the sine wave oscillator 27 is set to FMmin which is an adjustable minimum value.

Next, a step S330 performs an S/N ratio measurement and obtains a measured value SNdet, which is the S/N ratio of the fundamental wave component of the second beat signal Sb2 entered in the signal processing section 24. Then, in a step S340, a judgement is made to check whether the measured value SNdet is smaller than the peak value SNp. When the judgement result is YES (i.e., SNp≧SNdet) in step S340, the control flow proceeds to a step S360. On the other hand, when the judgement result is NO (i.e., SNp<SNdet) in step S340, the control flow proceeds to a step S350. In step S350, the peak S/N value SNp is replaced (i.e., renewed) by the measured value SNdet. And, a corresponding frequency setting FMset of the sine wave oscillator 27 is memorized as a peak frequency FMp which is being set during the S/N ratio measurement of step S330. Then, the control flow proceeds to the step S360.

In step S360, in response to the frequency adjusting signal Se, the frequency setting FMset of the sine wave oscillator 27 is increased by a predetermined amount AFM (i.e., FMset←FMset+ΔFM). Then, in a next step S370, a judgement is made to check whether the increased frequency setting FMset is smaller than an adjustable maximum value FMmax of the sine wave oscillation 27. When the judgement result is YES (i.e., FMset≦FMmax) in step S370, the control flow returns to the step S330 and repeats the above-described steps S330 through S370. On the other hand, when the judgement result is NO (i.e., FMset>FMnax) in step S370, the control flow proceeds to a step S380. In the step S380, the settings for the sine wave oscillator 27 is performed in such a manner that the cyclic modulation signal Mb produced from the sine wave oscillator 27 has a frequency identical with the peak frequency FMp. Then, the adjustment processing of FIG. 12 is terminated.

The signal processing section 24 holds the settings finalized in the step S380, and carries out arithmetic processing for obtaining the distance and the relative velocity of the target object based on the beat signal Sb supplied from the high-frequency mixer 22.

As explained above, the radar apparatus 80 of the fifth embodiment adjusts the frequency Fs of the cyclic modulation signal Mb. The high-frequency mixer 22 produces the beat signal Sb whose higher harmonics have frequencies n×Fs±fu variable in response to the adjustment of the frequency Fs of the cyclic modulation signal Mb.

Accordingly, when a noise appears in the vicinity of a frequency n×Fs identical with n times of the frequency Fs of the cyclic modulation signal Mb, the fifth embodiment makes it possible to shift the frequencies n×fs±fu of the harmonic components of the beat signal Sb far from the noise. Thus, the S/N ratio of the beat signal Sb can be improved. Accuracy in the detection of the target is always assured regardless of any change of noise condition.

Figure 13:
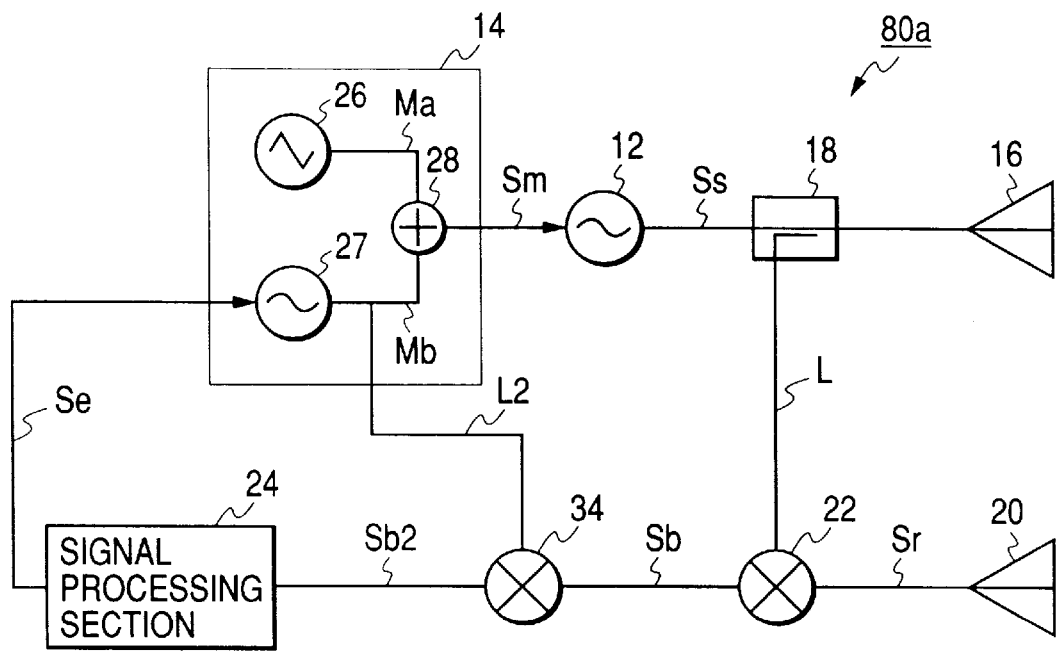
FIG. 13 is a schematic block diagram showing a modified arrangement of the radar system in accordance with the fifth embodiment of the present invention.

FIG. 13 shows a similar radar system 80a as a modification of the fifth embodiment of the present invention. The radar system 80a comprises an intermediate-frequency mixer 34 in addition to the arrangement of the radar system 80 shown in FIG. 11.

The intermediate-frequency mixer 34 is interposed between the high-frequency mixer 22 and the signal processing section 24, and is connected to the sine wave oscillator 27 to receive the cyclic modulation signal Mb as a second local signal L2. The intermediate-frequency mixer 34 mixes the beat signal Sb supplied from the high-frequency mixer 22 with the local signal L2, to produce a second beat signal Sb2.

The arrangement of the radar system 80a is advantageous in that the frequency Fs of the cyclic modulation signal Mb gives no substantial influence to the conversion of the primary harmonic components of the beat signal Sb produced by the high-frequency mixer 22 into the fundamental wave component of the second beat signal Sb2. This makes it possible to use a conventional cheaper signal processing device as the signal processing section 24 of the radar system 80a.

Figure 14:
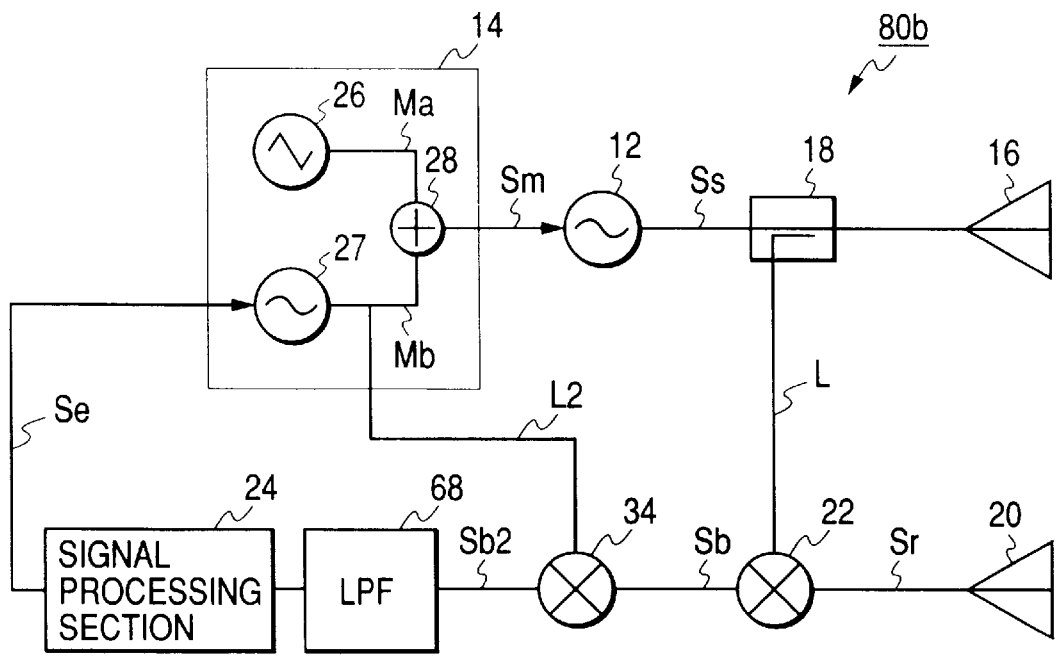
FIG. 14 is a schematic block diagram showing another modified arrangement of the radar system in accordance with the fourth embodiment of the present invention.

FIG. 14 shows a similar radar system 80b as another modification of the fifth embodiment of the present invention. The radar system 80b comprises a low-pass filter (LPF) 68 in addition to the arrangement of the radar system 80a shown in FIG. 13.

The low-pass filter 68 is interposed between the intermediate-frequency mixer 34 and the signal processing section 24. The low-pass filter 68 has a function of removing all of unnecessary harmonic components from the second beat signal Sb2 produced from the intermediate-frequency mixer 34, before the second beat signal Sb2 is entered into the signal processing section 24.

The arrangement of the radar system 80b is advantageous especially when the signal processing section 24 performs a signal detection based on a fast Fourier transform (FFT). The capability of removing undesirable harmonic components makes it possible to eliminate the well-known circulating phenomenon of higher harmonics in the fast Fourier transform (FFT). This kind of circulating phenomenon is generally caused by that signal components having frequencies larger than two times the to-be-detected frequency. Thus, it becomes possible to eliminate errors in the detection of the target object.

Figure 12:
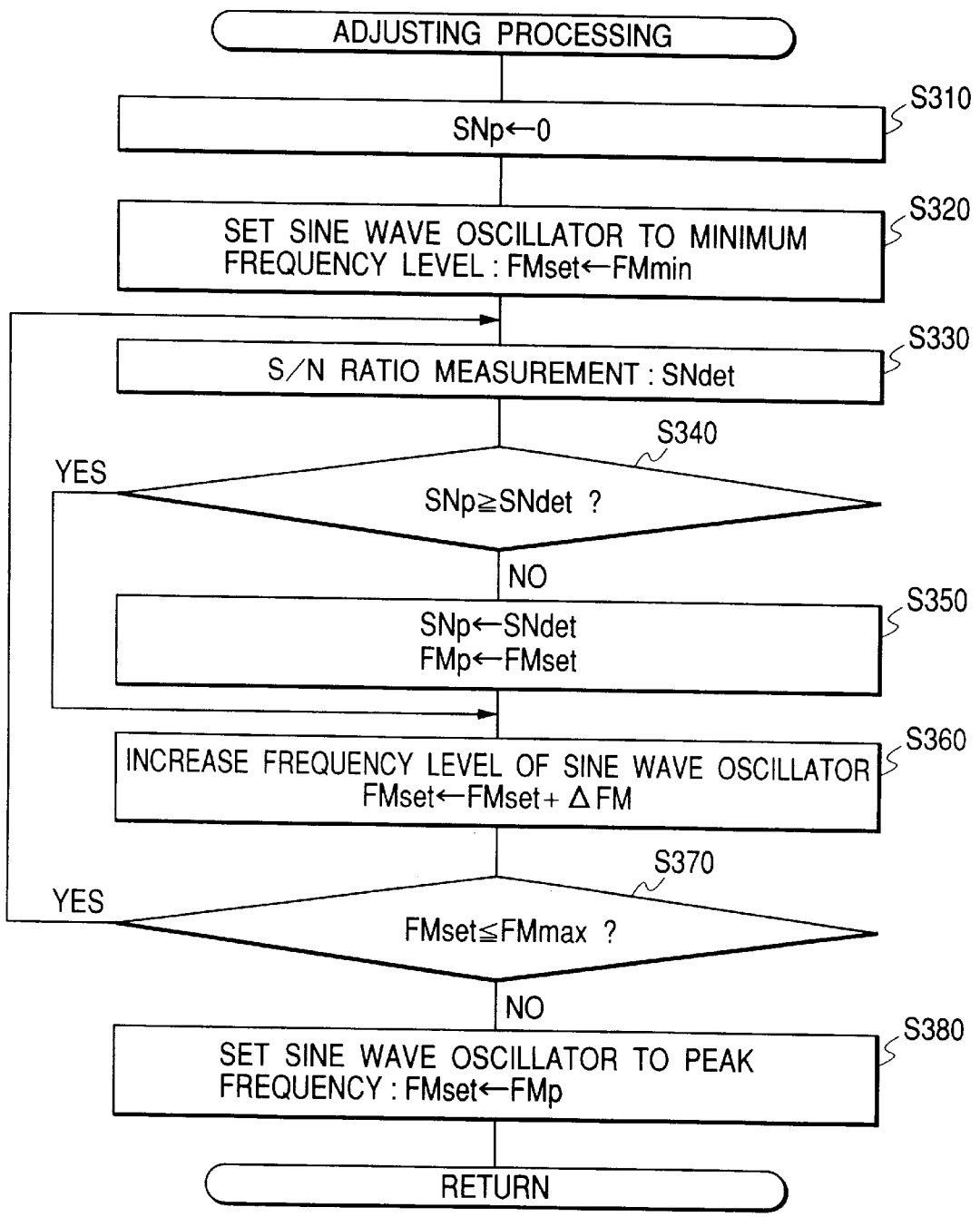
FIG. 12 is a flowchart showing an adjusting procedure in accordance with the fifth embodiment of the present invention.

An adjustment processing performed in the signal processing section 24 of the radar system 80a or 80b for determining the settings of the sine wave oscillator 27 is substantially identical with that disclosed in the flowchart of FIG. 12.

Sixth Embodiment

Figure 15:
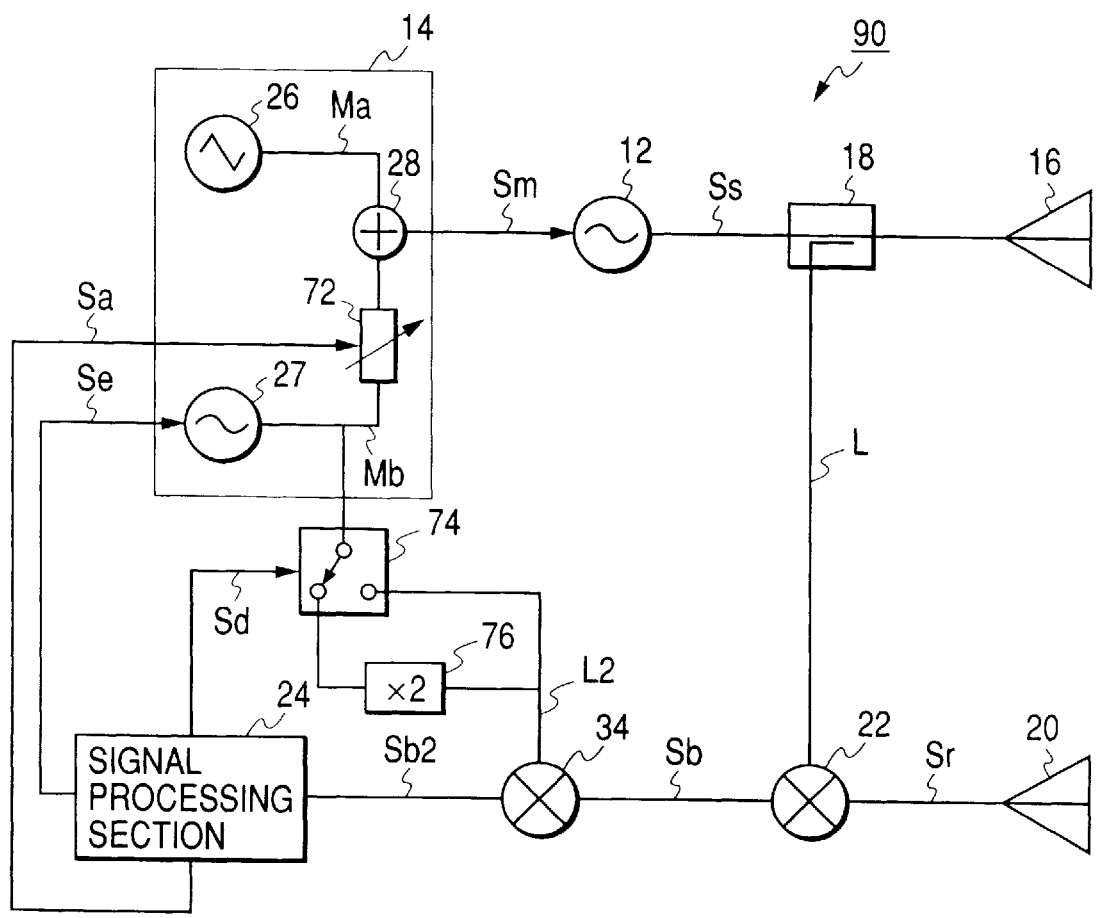
FIG. 15 is a schematic block diagram showing an arrangement of a radar system in accordance with a sixth embodiment of the present invention.

FIG. 15 shows an overall arrangement of a radar system 90 in accordance with a sixth embodiment of the present invention.

The radar system 90 of the sixth embodiment is substantially the same as the radar system 70 of the fourth embodiment, except that the sine wave oscillator 27 is controlled by the frequency adjusting signal Se supplied from the signal processing section 24. The sine wave oscillator 27 is preferably constituted by a voltage-controlled oscillator, so that the frequency Fs of the cyclic modulation signal Mb can be changed in response to the frequency adjusting signal Se supplied from the signal processing section 24.

According to the arrangement of the radar system 90 of the sixth embodiment, the intensity adjustor 72 is controlled by the intensity adjusting signal Sa so as to change the intensity of the cyclic modulation signal Mb supplied to the signal adder 28. The high-frequency mixer 22 produces a beat signal Sb with harmonic components whose intensities are variable in response to the adjustment in the intensity adjustor 72 (refer to FIG. 27A).

In response to the switching signal Sd, the cyclic modulation signal Mb of the sine wave oscillator 27 is directly supplied to the intermediate-frequency mixer 34. In this case, the primary harmonic components (having frequencies Fs±fu) of the beat signal Sb are converted into the fundamental wave component (having a frequency fu) of the second beat signal Sb2.

On the other hand, in response to the switching signal Sd, the cyclic modulation signal Mb of the sine wave oscillator 27 is indirectly supplied to the intermediate-frequency mixer 34 via the two times frequency multiplier 76. In this case, the secondary harmonic components (having frequencies 2×Fs±fu) of the beat signal Sb are converted into the fundamental wave component of the second beat signal Sb2.

Furthermore, the frequency Fs of the cyclic modulation signal Mb varies in accordance with the frequency adjusting signal Se. The higher-frequency mixer 22 produces the beat signal Sb with harmonic components whose frequencies n×Fs±fu are variable in response to the adjustment of the frequency Fs of the cyclic modulation signal Mb.

The signal processing section 24 of the radar system 90 determines the settings of second local signal L2, intensity adjustor 72 and sine wave oscillator 27. Hereinafter, details of the adjustment performed by the signal processing section 24 will be explained with reference to a flowchart shown in FIG. 16 as well as the flowchart shown in FIG. 8.

Figure 16:
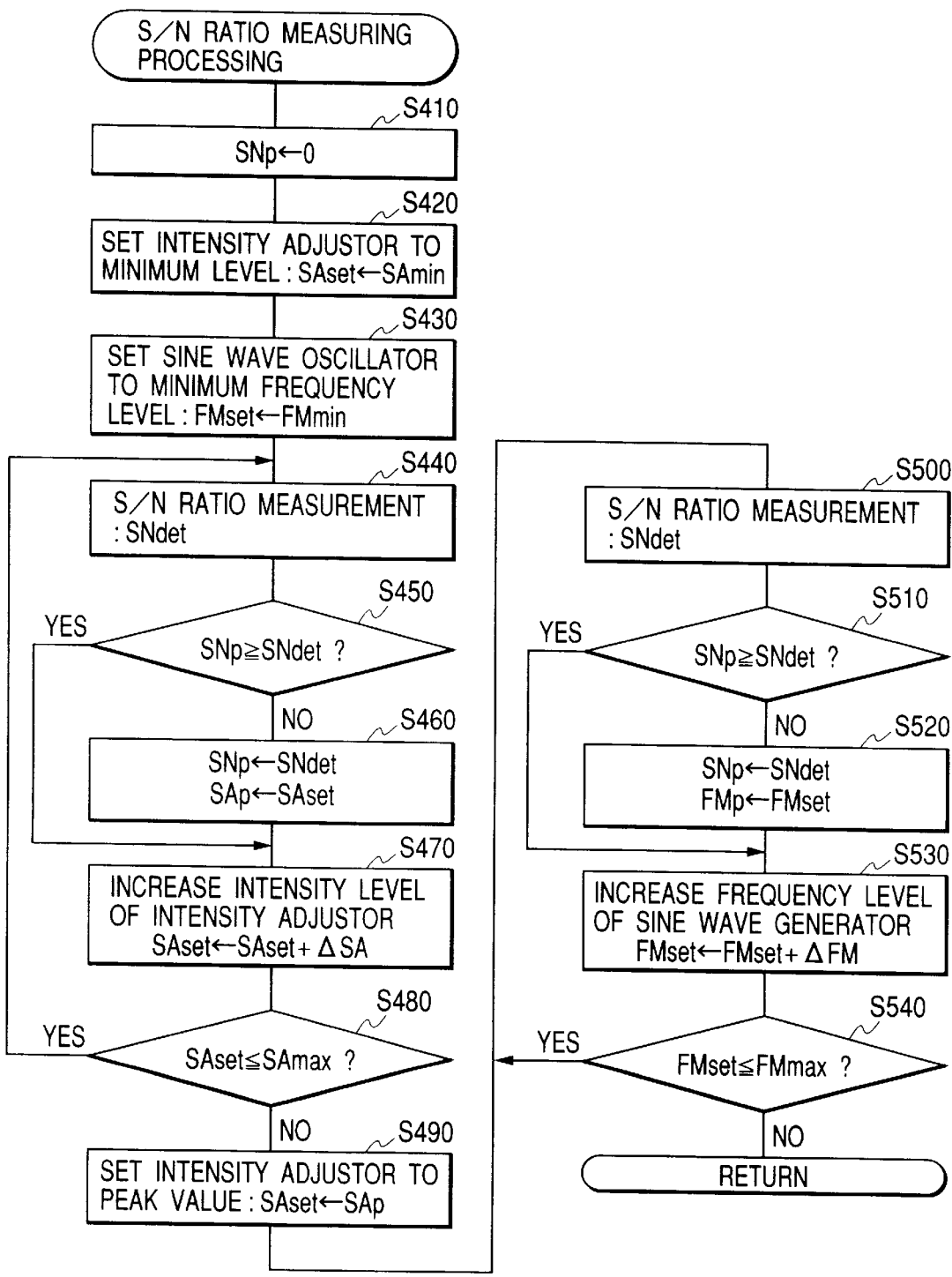
FIG. 16 is a flowchart showing details of S/N ratio measuring processing in accordance with the sixth embodiment of the present invention.

The adjustment processing performed by the radar system 90 of the sixth embodiment is substantially the same as that disclosed in the flowchart of FIG. 8 in connection with the radar system 70 of the fourth embodiment. However, the S/N ratio measuring processing (FIG. 9) of steps S120 and S150 is modified for the sixth embodiment. FIG. 16 shows a modified S/N ratio measuring processing performed in the sixth embodiment.

Furthermore, the six embodiment modifies the steps S130 and S160 so that the peak frequency FMp is memorized, as FM1 and FM2, in addition to the peak S/N value SNp and the peak intensity Sap.

Moreover, the six embodiment modifies the steps S180 and S190 so that the frequency Fs of the cyclic modulation signal Mb produced from the sine wave oscillator 27 is adjustable in response to the frequency adjusting signal Se. Thus, the steps S180 and S190 perform the adjustment of the frequency Fs by the frequency adjusting signal Se to take the peak frequencies FM1 and FM2 in addition to the adjustment of the second local signal switching circuit 74 by the switching signal Sd as well as the adjustment of the intensity adjustor 72 by the intensity adjusting signal Sa.

Details of the S/N ratio measuring processing performed in the sixth embodiment will be explained with reference to the flowchart shown in FIG. 16.

In a step S410, the peak value SNp of the S/N ratio stored in a register is cleared. In a next step S420, in response to the intensity adjusting signal Sa, the intensity setting SAset of the intensity adjustor 72 is set to SAmin which is an adjustable minimum value. In a next step S430, in response to the frequency adjusting signal Se, the frequency setting FMset of the sine wave oscillator 27 is set to FMmin which is an adjustable minimum value.

Next, a step S440 performs an S/N ratio measurement and obtains a measured value SNdet, which is the S/N ratio of the fundamental wave component of the second beat signal Sb2 entered in the signal processing section 24. Then, in a step S450, a judgement is made to check whether the measured value SNdet is smaller than the peak value SNp. When the judgement result is YES (i.e., SNp≧SNdet) in step S450, the control flow proceeds to a step S470. On the other hand, when the judgement result is NO (i.e., SNp<SNdet) in step S450, the control flow proceeds to a step S460. In step S460, the peak value SNp is replaced (i.e., renewed) by the measured value SNdet. And, a corresponding intensity setting SAset of the intensity adjustor 72 is memorized as the peak intensity SAp which is being set during the S/N ratio measurement of step S440. Then, the control flow proceeds to the step S470.

In step S470, in response to the intensity adjusting signal Sa, the intensity setting SAset of the intensity adjustor 72 is increased by the predetermined amount ΔSA (i.e., SAset←SAset+ΔSA). Then, in a next step S480, a judgement is made to check whether the increased intensity setting SAset is smaller than an adjustable maximum value SAmax of the intensity adjustor 72. When the judgement result is YES (i.e., SAset≦SAmax) in step S480, the control flow returns to the step S440 and repeats the above-described steps S440 through S480. On the other hand, when the judgement result is NO (i.e., SAset>SAmax) in step S480, the control flow proceeds to a step S490. In the step S490, the settings for the intensity adjustor 72 is performed so that the intensity adjustor 72 has the peak intensity SAp (i.e., SAset←SAp). Then, the control flow proceeds to a step S550.

The step S500 performs an S/N ratio measurement and obtains a measured value SNdet, which is the S/N ratio of the fundamental wave component of the second beat signal Sb2 entered in the signal processing section 24. Then, in a step S510, a judgement is made to check whether the measured value SNdet is smaller than the peak value SNp. When the judgement result is YES (i.e., SNp≧SNdet) in step S510, the control flow proceeds to a step S530. On the other hand, when the judgement result is NO (i.e., SNp<SNdet) in step S510, the control flow proceeds to a step S520. In step S520, the peak S/N value SNp is replaced (i.e., renewed) by the measured value SNdet. And, a corresponding frequency setting FMset of the sine wave oscillator 27 is memorized as a peak frequency FMp which is being set during the S/N ratio measurement of step S500. Then, the control flow proceeds to the step S530.

In step S530, in response to the frequency adjusting signal Se, the frequency setting FMset of the sine wave oscillator 27 is increased by the predetermined amount ΔFM (i.e., FMset←FMset+ΔFM). Then, in a next step S540, a judgement is made to check whether the increased frequency setting FMset is smaller than an adjustable maximum value FMmax of the sine wave oscillation 27. When the judgement result is YES (i.e., FMset≦FMmax) in step S540, the control flow returns to the step S500 and repeats the above-described steps S500 through S540. On the other hand, when the judgement result is NO (i.e., FMset>FMmax) in step S540, the control flow returns to the adjustment routine of FIG. 8.

According to the adjustment of the sixth embodiment, the S/N ratio measuring processing is carried out in response to each setting of the second local signal switching circuit 74. The second local signal switching circuit 74 is always switched to an optimum side having a better peak value SNp of the S/N ratio. Then, the adjustment is carried out in such a manner the intensity adjustor 72 and the sine wave oscillator 27 have the peak intensity SAp and the peak frequency FMp, respectively.

As explained above, the radar system 90 of the sixth embodiment is substantially a combination of the radar system 70 of the fourth embodiment and the radar system 80 of the fifth embodiment. Needless to say, the effects of the fourth and fifth embodiments can be enjoyed. Only the excellent harmonic components of the beat signal Sb having better S/N ratio can be used in the target object detecting operation. Thus, the sixth embodiment provides a radar system robust against noises.

For example, noise may appear in a relatively wide frequency range. In such a case, the second local signal switching circuit 74 selects the harmonic components of the beat signal Sb existing in a low-noise region. Furthermore, the sine wave oscillator 27 changes the frequency Fs of the cyclic modulation signal Mb, so that the frequency Fs is shifted to a better S/N region. In this manner, the sixth embodiment makes it possible to realize an accurate and reliable adjustment in a wide frequency range.

Seventh Embodiment

Figure 17:
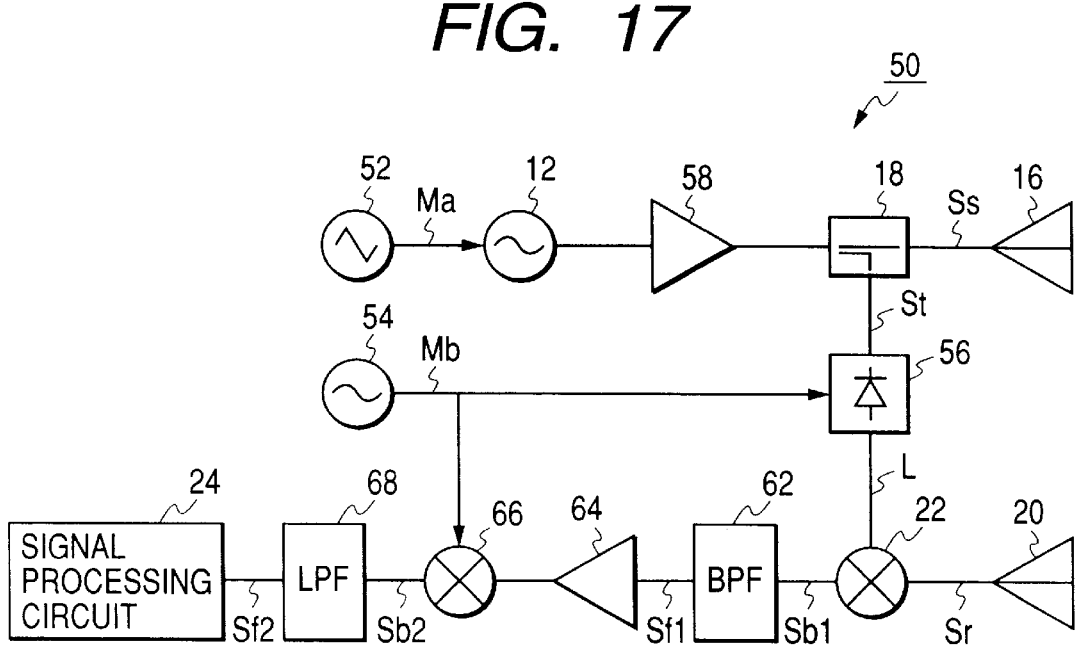
FIG. 17 is a schematic block diagram showing an arrangement of a radar system in accordance with a seventh embodiment of the present invention.

FIG. 17 shows an overall arrangement of a radar system 50 in accordance with a seventh embodiment of the present invention.

The radar system 50 of the seventh embodiment differs from the radar system 10 of the first embodiment in that the modulation signal generator 14 is replaced by a triangular wave oscillator 52. The triangular wave oscillator 52 is connected to the voltage-controlled oscillator 12 to produce a triangular wave modulation signal Ma having a cyclic period T. The voltage-controlled oscillator 12 causes a modulation in such a manner the modulation frequency once increases linearly relative to time and then decreases reversely.

Furthermore, the radar system 50 comprises an amplifier 58 interposed between the voltage-controlled oscillator 12 and the distributor 18. The amplifier 58 amplifies an output of the voltage-controlled oscillator 12 and supplies an amplified signal to the distributor 18. An amplitude modulator 56 is interposed between the distributor 18 and the high-frequency mixer 22. The amplitude modulator 56 modulates the amplitude of a branch signal St which is part of the transmitting signal Ss and branched by the distributor 18. A modulation signal oscillator 54 is connected to the amplitude modulator 56 and produces a local modulation signal Mb of a single frequency (hereinafter, referred to as "modulation frequency") Fp. The local modulation signal Mb is supplied to the amplitude modulator 56. The amplitude modulator 56 modulates the amplitude of the branch signal St in accordance with the local modulation signal Mb, and produces a modulated signal as a local signal L. The local signal L is supplied to the high-frequency mixer 22.

Furthermore, the radar system 50 comprises a band-pass filter (BPF) 62, a narrow-band amplifier 64, an intermediate-frequency mixer 66 and a low-pass filter (LPF) 68 serially connected between the high-frequency mixer 22 and the signal processing section 24. The band-pass filter (BPF) 62 receives the beat signal Sb1 from the high-frequency mixer 22 and removes unnecessary frequency components which are far from the modulation frequency Fp of the local modulation signal Mb. The narrow-band amplifier 64 amplifies a filtered signal Sf1 produced from the band-pass filter 62. The intermediate-frequency mixer 66 mixes an output of the narrow-band amplifier 64 with the local modulation signal Mb, and produces a second beat signal Sb2 which is equivalent to a difference between the mixed signals. The low-pass filter 68 removes higher-frequency components from the second beat signal Sb2 supplied from the intermediate-frequency mixer 66, and supplied a filtered signal Sf2 to the signal processing section 24.

The band-pass filter 62 has a central frequency identical with the modulation frequency Fp, with a band width equivalent to two times a maximum value (i.e., detectable upper limit) of the beat signal which is a frequency difference between the transmitting signal Ss and the received signal Sr at a certain time. In other words, the band-pass filter 62 has a frequency passband region at least ranging from Fp−fu to Fp+fu. Similarly, the narrow-band amplifier 64 can amplify the signal components ranging from Fp−fu to Fp+fu.

According to the radar system 50 of the seventh embodiment, the voltage-controlled oscillator 12 produces the transmitting signal Ss whose frequency is modulated in accordance with the modulation signal Mb supplied from the triangular wave oscillator 52. The amplifier 58 amplifies the transmitting signal Ss produced from the voltage-controlled oscillator 12.

When a central frequency F0 of the transmitting signal Ss has an angular velocity ω(=2π·F0), the transmitting signal Ss is expressed by the following equation.

$$Ss = A \cdot \cos\{\omega t + M(t)\} \qquad (4)$$

where M(t)=Δω·∫m(t)dt, when Δω represents an angular velocity change per unit voltage of the voltage-controlled oscillator 12 and m(t) represents a voltage value of the modulation signal Ma.

Figures 30A, 30B:
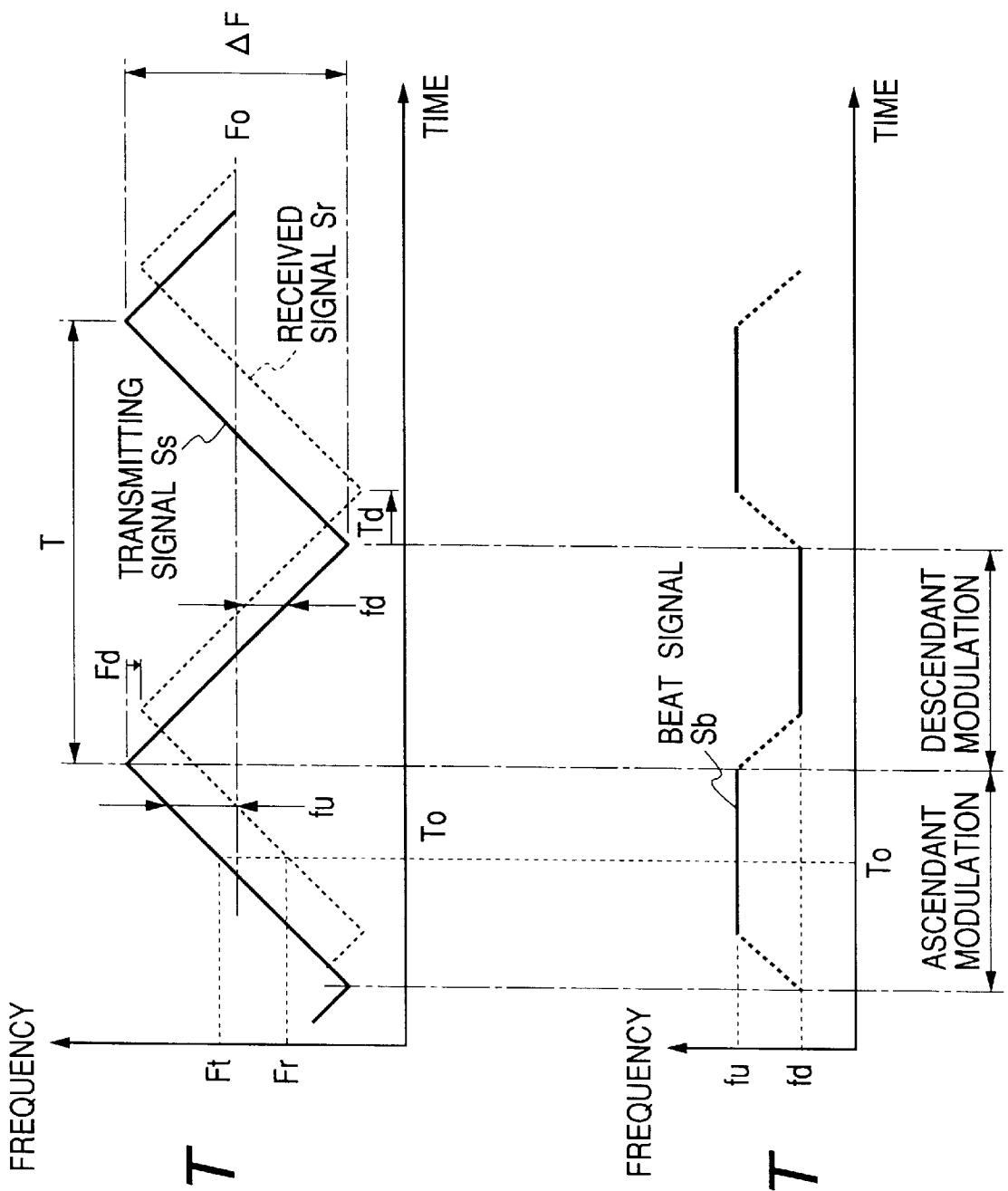
FIGS. 30A and 30B are time charts explaining an operation of a conventional FMCW radar.
Figure 31:
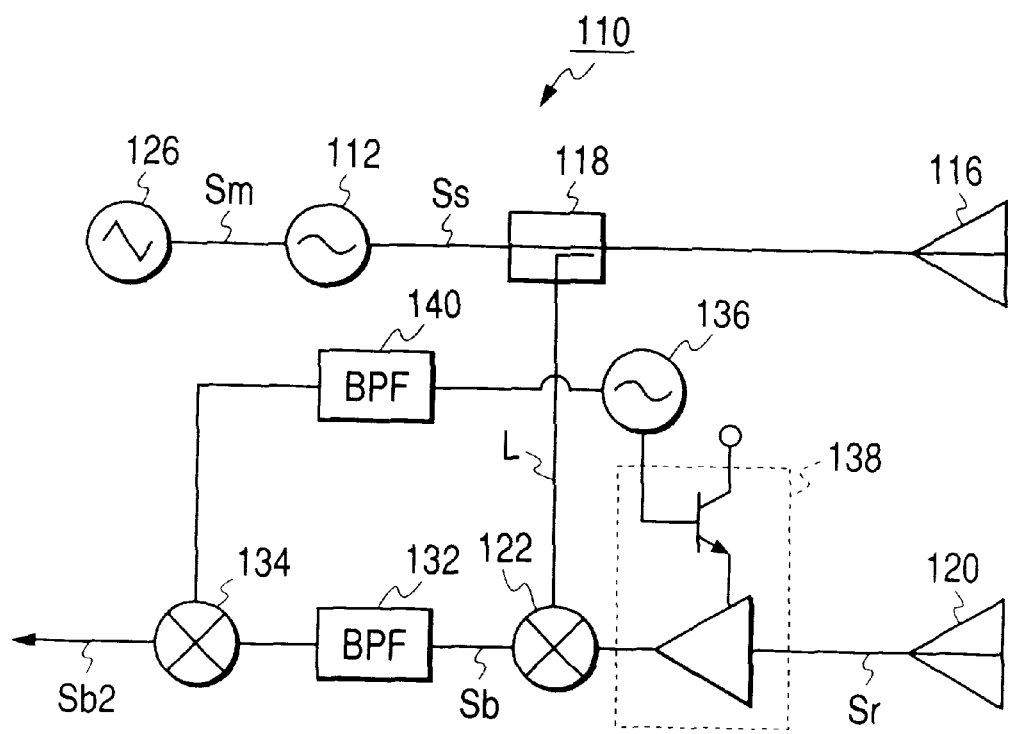
FIG. 31 is a schematic block diagram showing an arrangement of a conventional radar system.

A solid line of FIG. 30 shows a frequency change of the transmitting signal Ss.

The transmitter antenna 16 emits a radar wave carrying this transmitting signal Ss. The distributor 18 separates part of the transmitting signal Ss as the branch signal St. The branch signal St can be expressed in the same manner as the transmitting signal Ss, except for its amplitude A1 (<A). Thus, the branch signal St is expressed by the following equation (5).

$$St = A1 \cdot \cos\{\omega t + M(t)\} \qquad (5)$$

$$= A1 \cdot \cos\{2\pi \cdot Ft \cdot t\}$$

where Ft represents a momentary frequency of the branch signal St at a certain time t.

The local modulation signal Mb having a frequency Fp is expressed by the following equation (6).

$$Mb = \cos(2\pi \cdot Fp \cdot t) \quad (6)$$

When this local modulation signal Mb is used for an amplitude modulation of the branch signal St, the resulting local signal L is expressed by the following equation (7).

$$L = (1 + K \cdot Mb) \times St \quad (7)$$
$$= \{1 + K \cdot \cos(2\pi \cdot Fp \cdot t)\} \times A1 \cdot \cos(2\pi \cdot Ft \cdot t)$$

$$= A1 \cdot \cos(2\pi \cdot Fp \cdot t) + B1 \cdot \cos\{2\pi \cdot (Ft - Fp) \cdot t\} + \quad (7a)$$
$$B1 \cdot \cos\{2\pi \cdot (Ft + Fp) \cdot t\}$$

where K represents a modulation degree, and $B1 = K \cdot A1/2$.

Figure 28A:
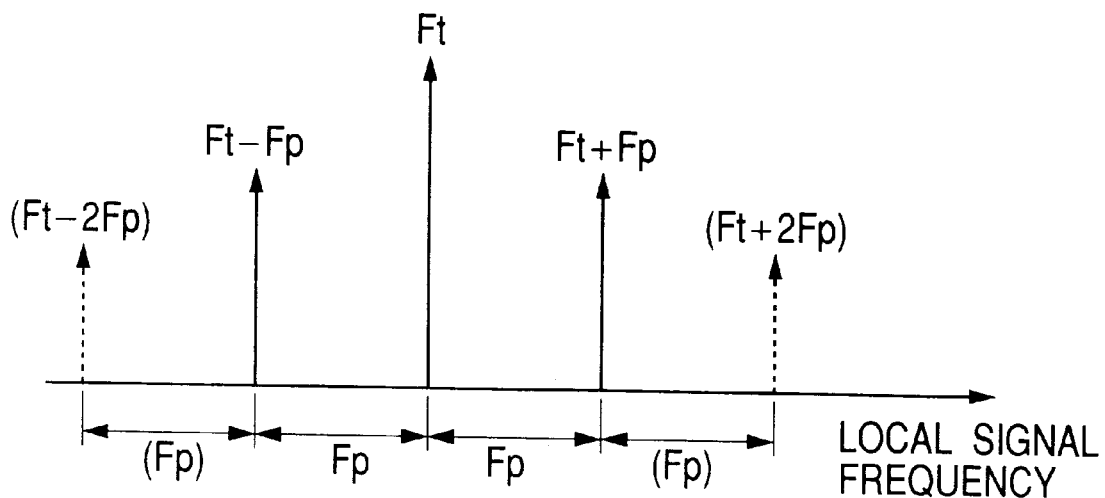
FIGS. 28A and 28B are views explaining signal components involved in the local signal and the received signal in accordance with a second aspect of the present invention.
Figure 28B:
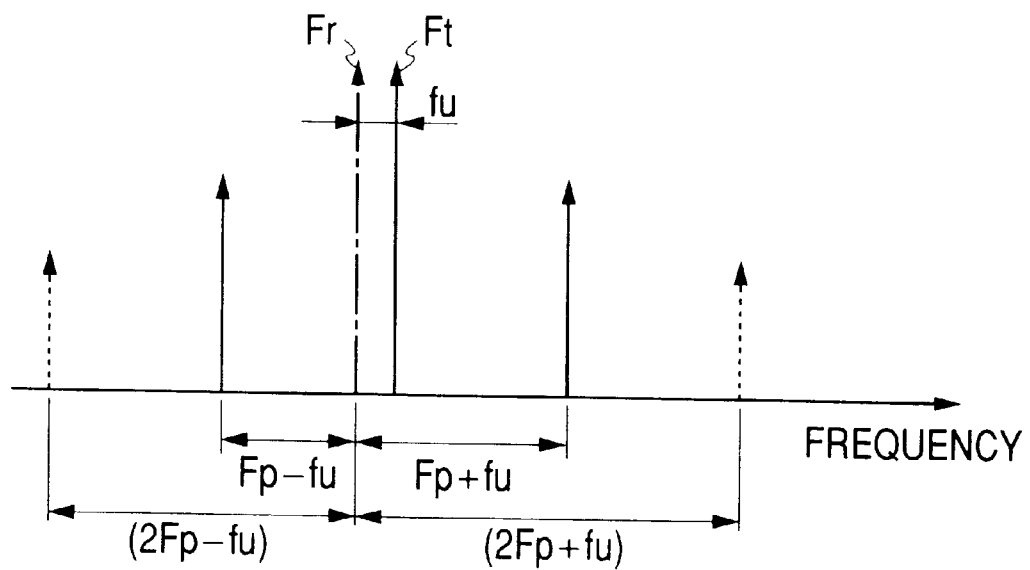
Figure 29:
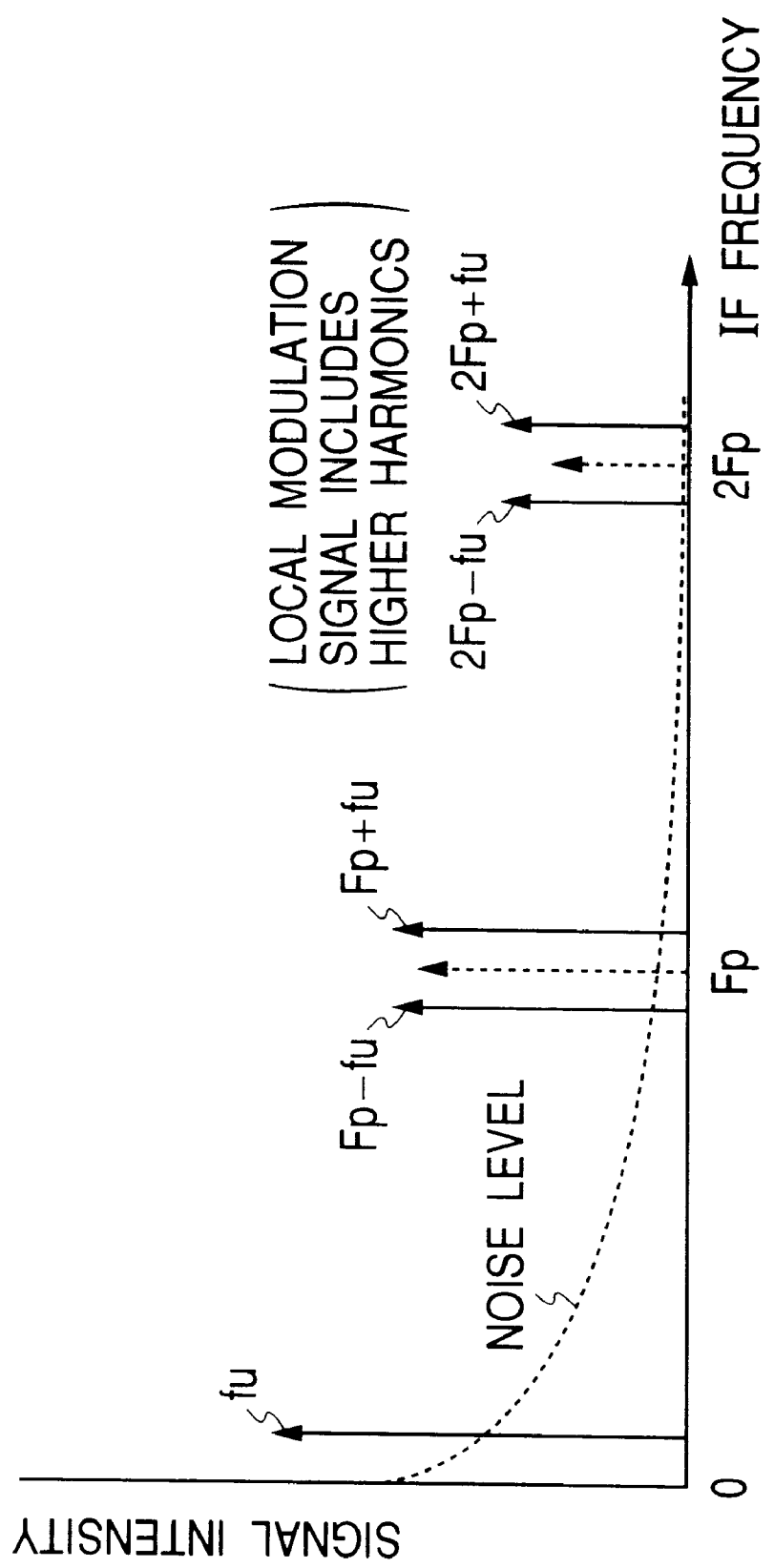
FIG. 29 is a view showing signal components involved in the beat signal in accordance with the second aspect of the present invention.

As apparent from the equation (7a), the local signal L at a certain time "t" comprises the frequencies Ft and (Ft±Fp) as signal components (refer to FIG. 28A). The frequency Ft of the branch signal St is identical with the frequency of the transmitting signal Ss. Therefore, Ft is referred to as "transmitting frequency", hereinafter.

On the other hand, the received signal Sr received from the receiver antenna 20 is expressed by the following equation (8).

$$Sr = A2 \cdot \cos\{\omega(t - \Delta t) + M(t - \Delta t) + \alpha\} \quad (8)$$

$$= A2 \cdot \cos\{2\pi \cdot Fr \cdot t\} \quad (9)$$

where $\Delta t$ represents a time required for the radar wave to go and return between the radar system 50 and a target object, and $\alpha$ represents a Doppler-shift factor caused by a speed difference between the radar system and the target object. Fr represents a frequency of the received signal Sr.

A dotted line of FIG. 30 shows a frequency change of the received signal Sr.

The high-frequency mixer 22 mixes the received signal Sr supplied from the receiver antenna 20 with the local signal L supplied from the amplitude modulator 56, and produces the beat signal Sb1 represented by the following equation (10).

$$Sb1 = (L + Sr)^2 + N \quad (10)$$

As apparent from the equation (10), the beat signal Sb1 comprises a square component $(L+Sr)^2$ and a noise component N including low-frequency noises of the high-frequency mixer 22.

The filtered signal Sf1 is extracted from the beat signal Sb1 through the band-pass filter 62 and the narrow-band amplifier 64. The filtered signal Sf1 has a frequency component in the vicinity of the modulation frequency Fp, and is expressed by the following equation (11).

$$Sf1 = B2 \cdot \cos(2\pi \cdot Fp \cdot t) \times \cos\{2\pi \cdot (Ft - Fr) \cdot t\} \quad (11)$$

where $B2 = K \cdot A1 \cdot A2$.

Furthermore, the intermediate-frequency mixer 66 mixes the filtered signal Sf1 with the local modulation signal Mb, and produces a mixed signal as the second beat signal Sb2 expressed by the following equation (12).

$$Sb2 = (Sf1 + Mb)^2 \quad (12)$$
$$= [B2 \cdot \cos(2\pi \cdot Fp \cdot t) \times \cos\{2\pi \cdot (Ft - Fr) \cdot t\} +$$
$$\cos(2\pi \cdot Fp \cdot t)]^2$$

The low-pass filter 68 removes the unnecessary higher-frequency components from the second beat signal Sb2, and produces the filtered signal Sf2 expressed by the following equation (13).

$$Sf2 = B2 \cdot \cos\{2\pi \cdot (Ft - Fr) \cdot t\} \quad (13)$$

The signal processing section 24 executes the arithmetic processing for obtaining a distance R and a relative velocity V of the target object based on the beat frequency fu which is detected through an analysis of the filtered signal Sf2.

As explained above, the radar system 50 of the seventh embodiment separates the branch signal St from the transmitting signal Ss, and modulates the amplitude of the branch signal St in accordance with the local modulation signal Mb having the modulation frequency Fp. The local signal L thus produced is supplied to the high-frequency mixer 22, and mixed with the received signal Sr. Accordingly, it becomes possible to produced the beat signal Sb1 comprising the fundamental wave component (frequency=fu) as well as the harmonic components (frequencies Fp±fu) of the beat signal.

According to the radar system 50 of the seventh embodiment, it is preferable to set the modulation frequency Fp of the local modulation signal Mb in a range of several MHz to several tens Mhz. This is effective to minimize the influence of low-frequency noises added to the output of the high-frequency mixer 22. This makes it possible to obtain the beat signal Sb1 comprising harmonic components (having frequencies Fp±fu) excellent in the S/N ratio. Thus, the signal processing section 24 can perform the arithmetic processing using such excellent harmonic components. The beat frequencies fu and fd can be detected accurately. The distance and the relative velocity of the target object can be obtained accurately.

Figure 18:
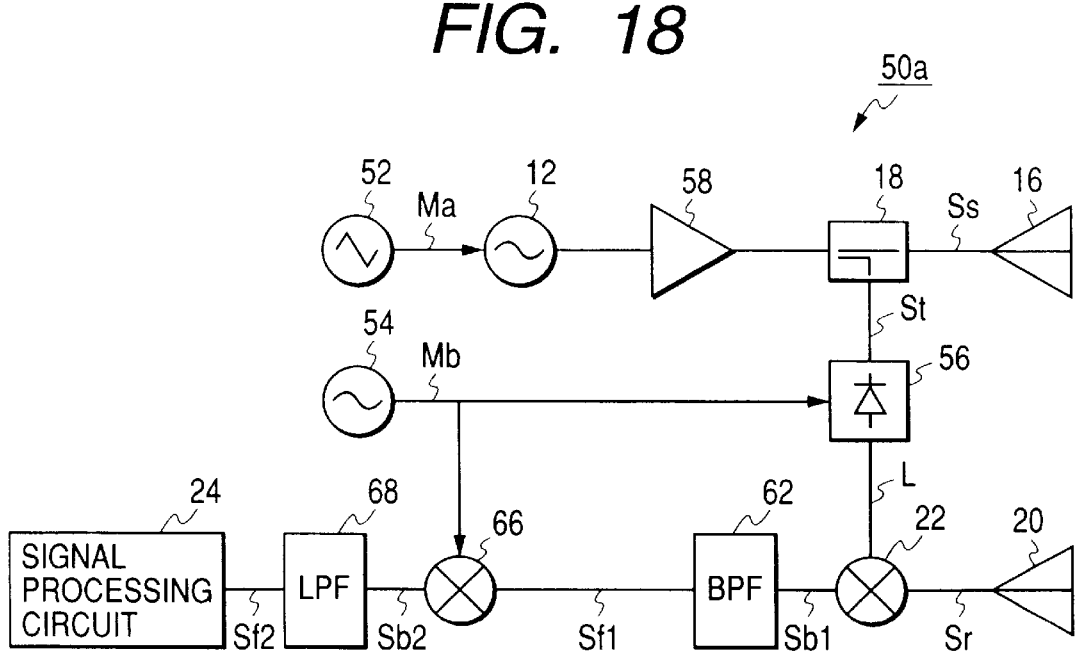
FIG. 18 is a schematic block diagram showing a modified arrangement of the radar system in accordance with the seventh embodiment of the present invention.

According to the above-described seventh embodiment, the band-pass filter 62 and the narrow-band amplifier 64 are interposed between the high-frequency mixer 22 and the intermediate-frequency mixer 66. However, when the beat signal Sb1 produced from the high-frequency mixer 22 has a sufficiently large signal level, it is possible to omit the narrow-band amplifier 64 as shown in a modified radar system 50a of FIG. 18.

Figure 19:
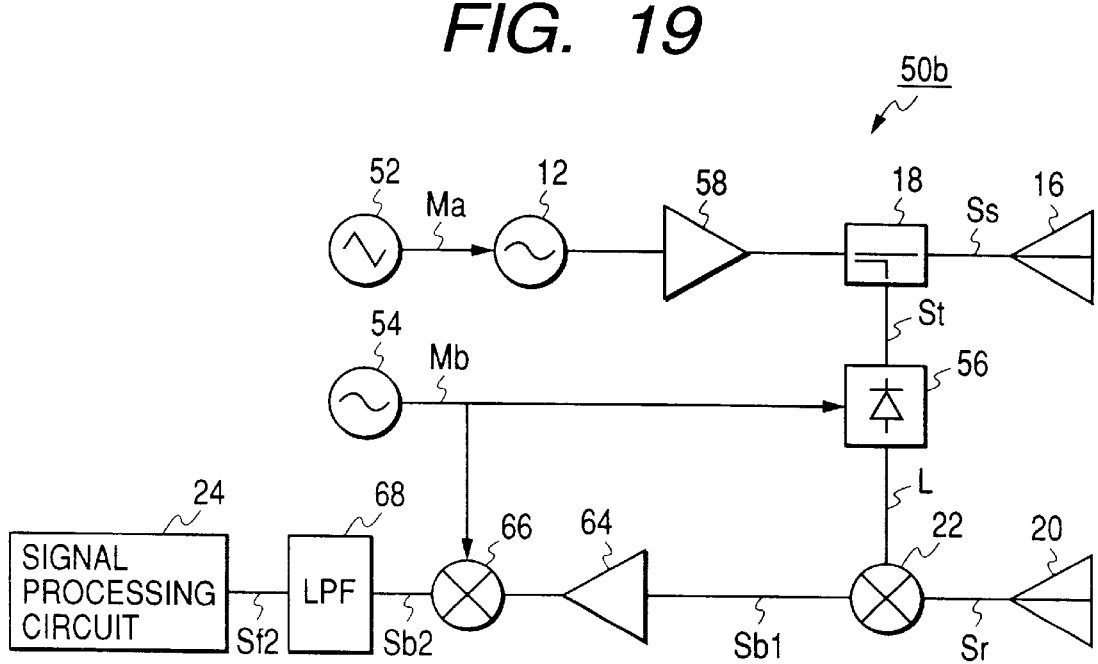
FIG. 19 is a schematic block diagram showing another modified arrangement of the radar system in accordance with the seventh embodiment of the present invention.

If the narrow-band amplifier 64 has a sufficiently narrow amplification band width, the harmonic components of the beat signal used in the signal processing section 24 will be sufficiently amplified with a relatively reduced percentage of the unnecessary signal components. In such a case, it is possible to omit the band-pass filter 62 as shown in a modified radar system 50b of FIG. 19.

Figure 20:
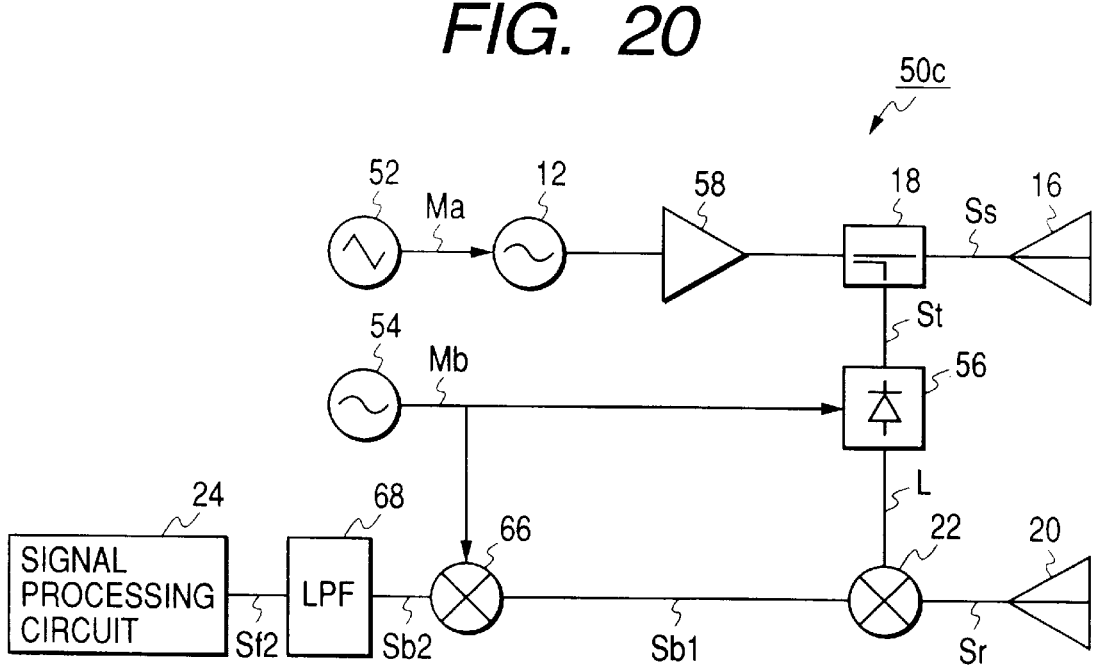
FIG. 20 is a schematic block diagram showing another modified arrangement of the radar system in accordance with the seventh embodiment of the present invention.

Recently, many of ordinary mixers can remove the low-frequency components when they receive input signals. Considering such an improved capability, it will be possible to omit both the band-pass filter 62 and the narrow-band amplifier 64 as shown in a modified radar system 50c of FIG. 20.

Eighth Embodiment

Figure 21:
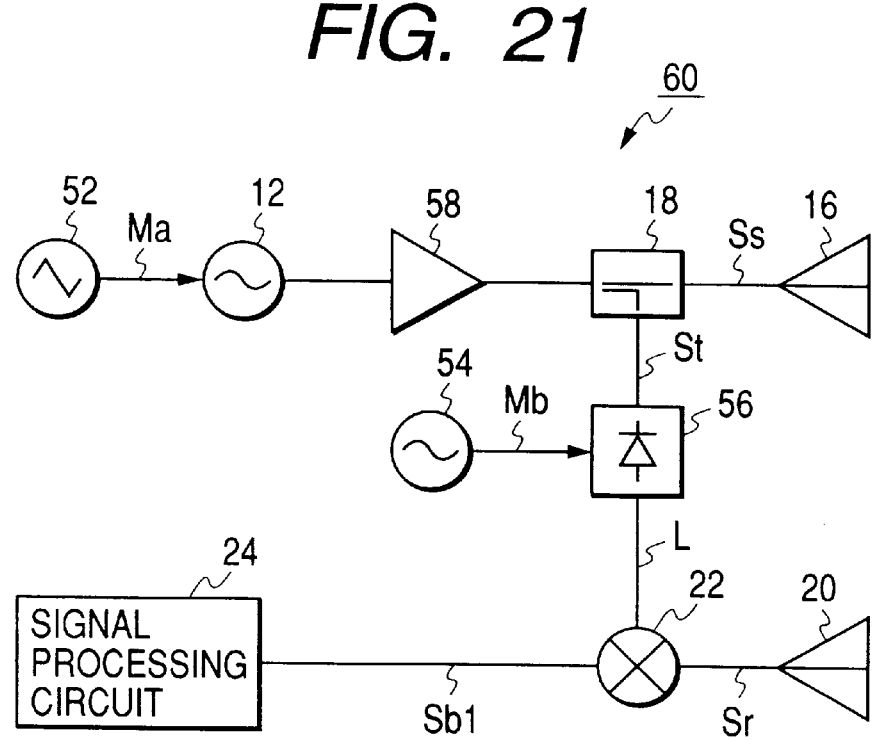
FIG. 21 is a schematic block diagram showing an arrangement of a radar system in accordance with an eighth embodiment of the present invention.

FIG. 21 shows an overall arrangement of a radar system 60 in accordance with an eighth embodiment of the present invention.

The radar system 60 of the eighth embodiment differs from the radar system 50 of the seventh embodiment in that the band-pass filter 62, the narrow-band amplifier 64, the intermediate-frequency mixer 66 and the low-pass filter 68 are all omitted.

According to the radar system 60 of the eighth embodiment, the first beat signal Sb1 produced from the high-frequency mixer 22 is directly entered into the signal processing section 24.

The signal processing section 24 executes the FFT processing on the first beat signal Sb1 thus supplied, and extracts only the signal components having frequencies of Fp±fu among the detected signal components. The extracted signal components are used to obtain the beat frequency fu for calculating the distance and the relative velocity of the target object.

As described above, the radar system 60 of the eighth embodiment processes the unnecessary signal components not used for detecting the beat frequency fu in the signal processing section 24. This may unnecessarily increase a computation amount in the signal processing section 24. However, the system arrangement can be simplified significantly.

Moreover, it is possible that the radar system 60 includes at least one of the band-pass filter 62 and the narrow-band amplifier 64 disclosed in the radar system 50 of the seventh embodiment. This or these components (62, 64) will be interposed between the high-frequency mixer 22 and the signal processing section 24.

Ninth Embodiment

Figure 22:
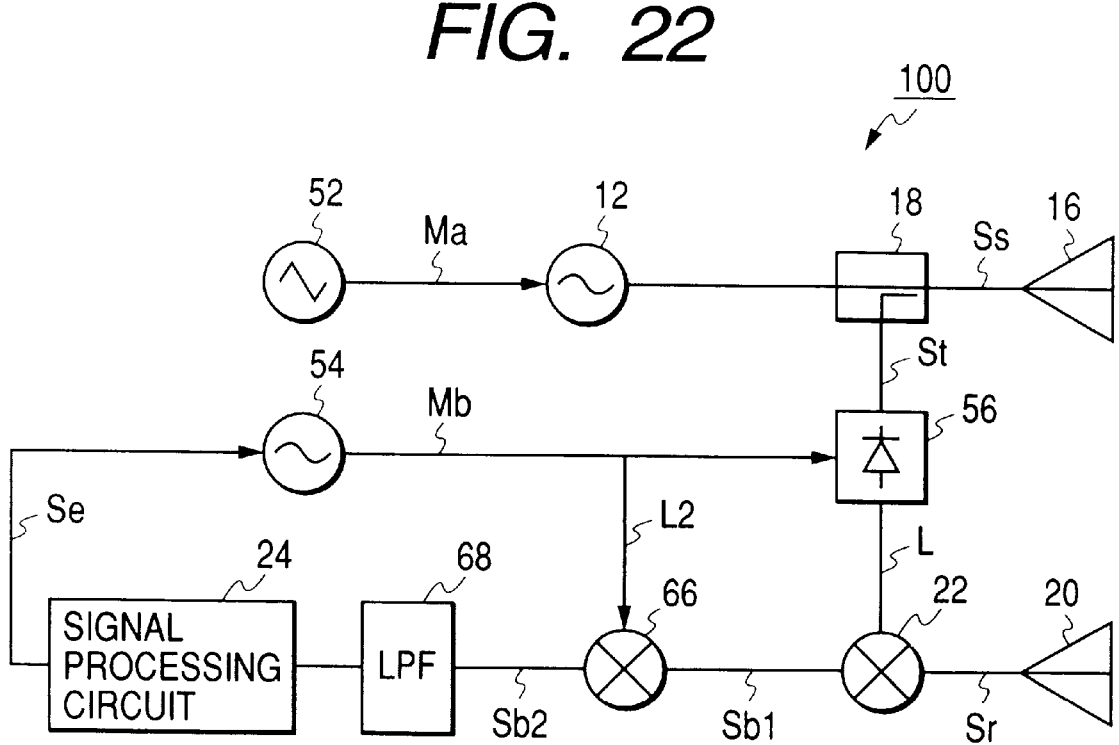
FIG. 22 is a schematic block diagram showing an arrangement of a radar system in accordance with a ninth embodiment of the present invention.
Figure 23A:
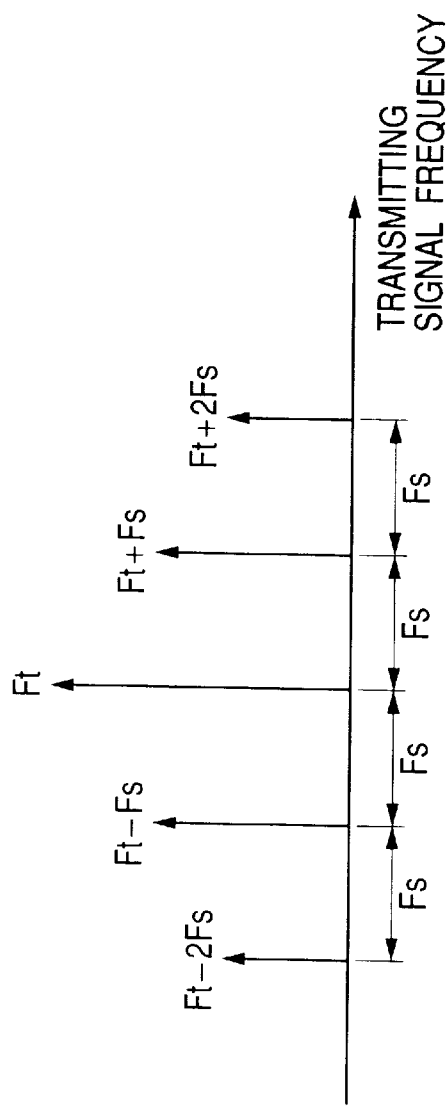
FIGS. 23A and 23B are views explaining signal components involved in the beat signal in accordance with a first aspect of the present invention.
Figure 23B:
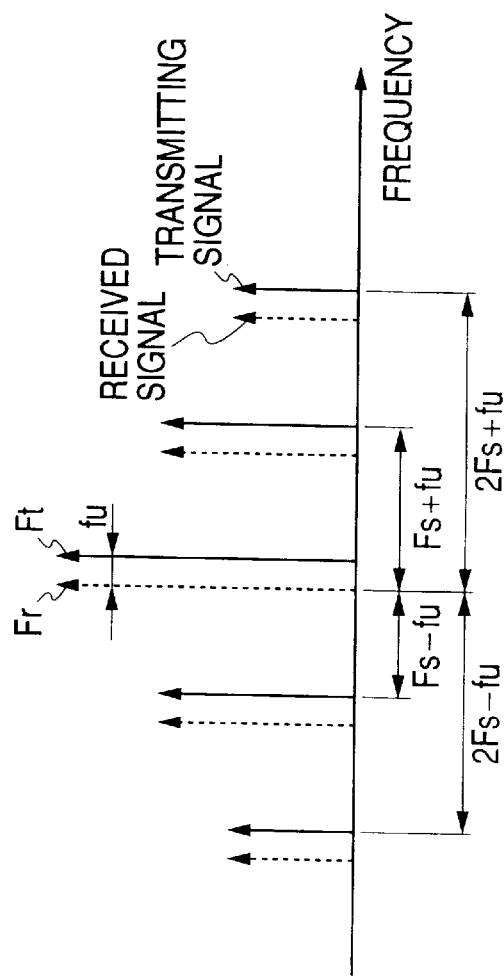

FIG. 22 shows an overall arrangement of a radar system 100 in accordance with a ninth embodiment of the present invention.

The radar system 100 of the ninth embodiment is substantially identical with the modified radar system 50c (FIG. 20) of the seventh embodiment, except that the amplifier 58 is omitted and the modulation signal oscillator 54 is controlled by the signal processing section 24. Preferably, the modulation signal oscillator 54 is constituted by a voltage-controlled oscillator which is capable of varying the frequency Fp of the local modulation signal Mb in response to the frequency adjusting signal Se.

According to the radar system 100 of the ninth embodiment, the frequency Fp of the local modulation signal Mb is variable in accordance with the frequency adjusting signal Se. The high-frequency mixer 22 produces the beat signal Sb1 having harmonic components whose frequencies Fs±fu are variable in response to the adjustment of the frequency Fp of the local modulation signal Mb.

The signal processing section 24 of the ninth embodiment determines the settings of the modulation signal oscillator 54. The adjustment processing performed in the signal processing section 24 is substantially identical with the adjustment processing for the settings of the sine wave oscillator 27 in the fifth embodiment. However, when the flowchart of FIG. 12 and the related explanation are applied to the ninth embodiment, "sine wave oscillator 27" should be replaced by the "modulation signal oscillator 54".

As explained above, the ninth embodiment makes it possible to adjust the frequency Fp of the local modulation signal Mb. Thus, the high-frequency mixer 22 can produce the beat signal Sb1 having harmonic components whose frequencies Fp±fu are variable.

Thus, the radar system 100 of the ninth embodiment has a capability of shifting the frequencies Fp±fu of the harmonic components of the beat signal Sb1 to a low-noise region when a noise appears in the vicinity of the frequency Fp of the local modulation signal Mb. Thus, it becomes possible to maintain an excellent S/N ratio. Thus, the target object detection can be carried out accurately, not being influenced by the generation of noises.

According to the above-described seventh to ninth embodiments, the modulation signal oscillator 54 produces a single frequency of Fp. However, it is also preferable that the modulation signal oscillator 54 produces a rectangular wave including many harmonics having frequencies n×Fp (n≧2).

In this case, as shown by a lotted line in FIG. 28A, the local signal L will include harmonics (2×Fp,3×Fp, - - - ). Thus, the high-frequency mixer 22 will produce the first beat signal Sb1 including higher-order harmonic components having frequencies 2×Fp±fu,3×Fp±fu, - - - in addition to the primary harmonic components having frequencies Fp±fu, in the same manner as in the above-described first to sixth embodiments. When the modulation frequency Fp cannot be set in an appropriate low-noise region for some reasons, such higher-order harmonic components can be used for the target object detection. This leads to a remarkable enhancement in the performance of radar systems 50, 60 and 100.

When the signal processing section 24 processes the n-order harmonic components (frequencies; n×Fp±fu) of the beat signal Sb1, it is preferable that the band-pass filter 62 and the narrow-band amplifier 64 have corresponding performances. Namely, the band-pass filter 62 has a frequency range covering at least from n×Fp−fu to n×Fp+fu. The narrow-band amplifier 64 has a capability of amplifying the signals in the range of n×Fp−fu to n×Fp+fu.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A radar system comprising:
   transmitting signal generating means for producing a high-frequency transmitting signal which is carried on a radar wave, said transmitting signal being frequency modulated in accordance with a linear modulation component and a cyclic modulation component, the transmitting signal generating means including
      first component generating means for producing said linear modulation component, the linear modulation component varying a frequency of said transmitting signal linearly relative to time,
      second component generating means for producing said cyclic modulation component, the cyclic modulation component varying said frequency of said transmitting signal cyclically at a cyclic frequency larger than twice a frequency of a beat signal,
      adding means for adding said linear modulation component and said cyclic modulation component and producing a modulation signal, and
      a high-frequency oscillator producing said high-frequency transmitting signal whose frequency is variable in accordance with said modulation signal;
   a high-frequency mixer for mixing a received signal of the radar wave reflected from a target object with a local signal derived from said transmitting signal produced from said transmitting signal generating means, and producing the beat signal, the beat signal being a signal having a frequency component representing a difference between said received signal and said local signal; and calculating means for obtaining a distance from the radar system and a velocity relative to the radar system of said target object based on harmonic components of said beat signal produced when said transmitting signal is modulated by said cyclic modulation component.

2. The radar system in accordance with claim 1, wherein an intermediate-frequency mixer mixes said beat signal supplied from said high-frequency mixer with said cyclic modulation component as a second local signal, and produces a second beat signal having a frequency component representing a difference between said mixed signals, and said calculating means calculates the distance and the relative velocity of said target object based on the fundamental wave component of said second beat signal supplied from said intermediate-frequency mixer.

3. The radar system in accordance with claim 2, wherein a low-pass filter is interposed between said intermediate-frequency mixer and said calculating means for removing unnecessary harmonic components from said second beat signal.

4. The radar system in accordance with claim 3, wherein a frequency multiplier receives said cyclic modulation component produced from said second component generating means and produces a frequency-multiplied modulation component whose frequency is equivalent to n times a frequency of said cyclic modulation component, where n is an integer; and said frequency-multiplied modulation component is supplied to said intermediate-frequency mixer as said second local signal.

5. The radar system in accordance with claim 2, wherein a band-pass filter is interposed between said high-frequency mixer and said intermediate-frequency mixer, said band-pass filter having a central frequency equivalent to a frequency of said second local signal with a band width wider than twice a frequency of said fundamental wave component of said beat signal.

6. The radar system in accordance with claim 2, further comprising:

frequency multiplying means for producing a frequency-multiplied modulation component whose frequency is equivalent to n times a frequency of said cyclic modulation component, where n is an integer;

local signal switching means for selectively supplying said cyclic modulation component or said frequency-multiplied modulation component to said intermediate-frequency mixer as said second local signal; and local signal switching control means for controlling a switching operation of said local signal switching means based on a signal-versus-noise ratio of said fundamental wave component of said beat signal entered in said calculating means, so that an optimized second local signal having a better signal-versus-noise ratio is supplied to said intermediate-frequency mixer.

7. The radar system in accordance with claim 6, further comprising:

a first band-pass filter having a central frequency equivalent to the frequency of said cyclic modulation component produced from said second component generating means with a band width wider than two times the frequency of said fundamental wave component of said beat signal;

a second band-pass filter having a central frequency equivalent to the frequency of said frequency-multiplied modulation component produced from said frequency multiplying means, filter switching means interposed between said high-frequency mixer and said intermediate-frequency mixer for cooperatively selecting said first band-pass filter or said second band-pass filter; and filter switching control means for controlling a switching operation of said filter switching means in such a manner that said first band-pass filter is selected when said cyclic modulation component is selected as said second local signal, while said frequency-multiplied modulation component is selected as said second local signal.

8. The radar system in accordance with claim 1, further comprising an intensity adjusting means associated with said second component generating means for adjusting a signal intensity of said cyclic modulation component; and an intensity adjustment control means provided for controlling an adjustment operation of said intensity adjusting means based on a signal-versus-noise ratio of said harmonic components of said beat signal entered in said calculating means, so that an optimized cyclic modulation component having a better signal-versus-noise ratio is supplied to said adding means.

9. The radar system in accordance with claim 1, wherein said second component generating means is associated with a frequency adjusting means for adjusting said frequency of said cyclic modulation component; and frequency adjustment control means is provided for controlling an adjustment operation of said frequency adjusting means based on a signal-versus-noise ratio of said harmonic components of said beat signal entered in said calculating means, so that an optimized cyclic modulation component having a better signal-versus-noise ratio is supplied to said adding means.

10. The radar system in accordance with claim 1, wherein said cyclic modulation component has a sine waveform signal.

11. A radar system comprising:

transmitting signal generating means for producing a high-frequency transmitting signal which is frequency modulated so as to vary linearly relative to time and is carried on a radar wave;

local signal generating means for producing a local signal based on a branch signal separated from said transmitting signal produced from said transmitting signal generating means; and a high-frequency mixer for mixing a received signal of the radar wave reflected from a target object with said local signal produced from said local signal generating means, and producing a beat signal having a frequency component representing a difference between said received signal and said local signal, wherein said local signal generating means comprises:

local modulation signal generating means for producing a local modulation signal having a fundamental wave component whose frequency is larger than twice the frequency of the frequency component of the beat signal representing a difference between said local signal and said received signal; and branch signal modulating means for modulating an amplitude of said branch signal in accordance with said local modulation signal produced from said local modulation signal generating means to produce said local signal.

12. The radar system in accordance with claim 11, further comprising calculating means for obtaining a distance and a relative velocity of said target object based on said beat signal produced from said high-frequency mixer.

13. The radar system in accordance with claim 11, further comprising an intermediate-frequency mixer which mixes said beat signal supplied from said high-frequency mixer with said local modulation signal supplied from said local modulation signal generating means, and produces a second beat signal having a frequency component representing a difference between said mixed signals.

14. The radar system in accordance with claim 13, further comprising calculating means for obtaining a distance from said radar system and a velocity relative to said radar system of said target object based on said second beat signal produced from said intermediate-frequency mixer.

15. The radar system in accordance with claim 13, further comprising a low-pass filter which removes unnecessary harmonic components from said second beat signal supplied from said intermediate-frequency mixer.

16. The radar system in accordance with claim 11, wherein
   at least one of a band-pass filter and a narrow-band amplifier is interposed between said high-frequency mixer and said intermediate-frequency mixer,
   said band-pass filter receiving said beat signal produced from said high-frequency mixer and removing unnecessary frequency components which are far from the frequency of said fundamental wave component of the local modulation signal, and
   said narrow-band amplifier amplifying a signal component whose frequency is close to said frequency of said fundamental wave component of said local modulation signal.

17. The radar system in accordance with claim 11, wherein
   said local modulation signal generating means is associated with frequency adjusting means for adjusting the frequency of said local modulation signal, and
   frequency adjustment control means is provided for controlling an adjustment operation of said frequency adjusting means based on a signal-versus-noise ratio of said fundamental wave component or harmonic components of said beat signal entered in said calculating means, so that an optimized local modulation signal having a better signal-versus-noise ratio is supplied to said branch signal modulating means.

18. The radar system in accordance with claim 11, wherein said local modulation signal produced from said local modulation signal generating means has a single frequency of said fundamental wave component.

19. The radar system in accordance with claim 11, wherein said local modulation signal produced from said local modulation signal generating means has a rectangular waveform.

* * * * *